US010166998B2

(12) United States Patent
Kamiya et al.

(10) Patent No.: US 10,166,998 B2
(45) Date of Patent: Jan. 1, 2019

(54) IMAGE PROCESSING DEVICE

(71) Applicant: DENSO CORPORATION, Kariya, Aichi-pref. (JP)

(72) Inventors: Akira Kamiya, Kariya (JP); Nozomi Kitagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 28 days.

(21) Appl. No.: 15/527,931

(22) PCT Filed: Nov. 17, 2015

(86) PCT No.: PCT/JP2015/005730
§ 371 (c)(1),
(2) Date: May 18, 2017

(87) PCT Pub. No.: WO2016/088312
PCT Pub. Date: Jun. 9, 2016

(65) Prior Publication Data
US 2018/0148072 A1 May 31, 2018

(30) Foreign Application Priority Data

Dec. 1, 2014 (JP) .................................. 2014-243429
Oct. 8, 2015 (JP) .................................. 2015-200537

(51) Int. Cl.
G06K 9/00 (2006.01)
G06T 7/60 (2017.01)
(Continued)

(52) U.S. Cl.
CPC ............ *B60W 50/14* (2013.01); *B60W 30/12* (2013.01); *G02B 27/0101* (2013.01);
(Continued)

(58) Field of Classification Search
CPC .... B60W 50/14; B60W 30/12; B60W 40/072; B60W 2050/146; B60W 2420/42;
(Continued)

(56) References Cited

U.S. PATENT DOCUMENTS

2002/0133285 A1* 9/2002 Hirasago ............ B60K 31/0008
701/96
2004/0212483 A1 10/2004 Braeuchle et al.
(Continued)

FOREIGN PATENT DOCUMENTS

JP 2006-31618 A 2/2002

*Primary Examiner* — Nicholas Kiswanto
(74) *Attorney, Agent, or Firm* — Knobbe, Martens, Olson & Bear, LLP

(57) ABSTRACT

An image processing device applied to a driving assistance system, which includes: a driving assistance device that detects a relative position of a lane marking with respect to a vehicle and assists a driving of the vehicle based on a detected positional information; and a head-up display device that projects a display image on a projection area arranged on the vehicle to visually recognize a virtual image of the display image, includes: an acquisition device that acquires the positional information; and a generation device that generates the display image including a predetermined display element. The generation device generates the display image to visually recognize the display element at a position associated with the positional information and to visually recognize the display element as a shape inclined toward the vehicle from the lane marking.

20 Claims, 18 Drawing Sheets

(51) Int. Cl.
*B60W 30/12* (2006.01)
*B60W 50/14* (2012.01)
*G02B 27/01* (2006.01)
*B60W 40/072* (2012.01)

(52) U.S. Cl.
CPC ....... *G06K 9/0061* (2013.01); *G06K 9/00798* (2013.01); *G06K 9/00832* (2013.01); *G06T 7/60* (2013.01); *B60W 40/072* (2013.01); *B60W 2050/146* (2013.01); *B60W 2420/42* (2013.01); *B60W 2550/10* (2013.01); *G02B 2027/014* (2013.01); *G02B 2027/0138* (2013.01); *G02B 2027/0141* (2013.01)

(58) Field of Classification Search
CPC ........... B60W 2550/10; G02B 27/0101; G02B 2027/0138; G02B 2027/014; G02B 2027/0141; G06K 9/0061; G06K 9/00798; G06K 9/00832; G06T 7/60
See application file for complete search history.

(56) References Cited

U.S. PATENT DOCUMENTS

| | | | | |
|---|---|---|---|---|
| 2009/0174577 A1* | 7/2009 | Nakamura | ......... | G06K 9/00798 340/995.1 |
| 2009/0306852 A1* | 12/2009 | Ikeda | .................... | B60W 50/14 701/36 |
| 2015/0055831 A1* | 2/2015 | Kawasaki | .......... | G06K 9/00798 382/104 |
| 2015/0248837 A1* | 9/2015 | Kim | ....................... | G08G 1/167 348/148 |

\* cited by examiner

IMAGE PROCESSING DEVICE

CROSS REFERENCE TO RELATED APPLICATION

This application is based on Japanese Patent Applications No. 2014-243429 filed on Dec. 1, 2014, and No. 2015-200537 filed on Oct. 8, 2015, the disclosures of which are incorporated herein by reference.

TECHNICAL FIELD

The present disclosure relates to an image processing device that generates a display image used for display in a head-up display device.

BACKGROUND ART

In recent years, there have been developed vehicles equipped with driving assistance devices such as a lane departure warning device (LDW device) and a lane keeping assist device (LKA device). Each of these devices captures an image of a traveling road using a camera and extracts a lane marking for travel from the captured image to acquire positional information of the lane marking. Then, when it is determined that a traveling vehicle has departed from the lane marking or the possibility of departure is high on the basis of the acquired positional information, the determination is notified to a driver for warning or a steering force is applied.

In a display device described in Patent Literature 1, when the above device is in a normally operable active state, the active state of the driving assistance device is notified to a driver by displaying a pattern that is suggestive of the active state on the display device. Further, there is a case unable to detect the lane marking such as when there is no lane marking on the traveling road, when the lane marking partially peels off, or when there is a foreign substance such as sand on the lane marking. In such a case, a driver is made to recognize that the driving assistance device is not in an active state by not displaying the pattern.

However, merely displaying the pattern in the above manner is not sufficient for intuitive recognition of an active state of the LDW device or the LKA device.

PRIOR ART LITERATURES

Patent Literature

Patent Literature 1: JP-2004-533080-A

SUMMARY OF INVENTION

It is an object of the present disclosure to provide an image processing device that makes it easy for a driver to intuitively recognize a state of a driving assistance device that operates by detecting the position of a lane marking.

According to an aspect of the present disclosure, an image processing device that generates a display image and is applied to a driving assistance system, which includes: a driving assistance device that detects a relative position of a lane marking arranged on a traveling road with respect to a vehicle and assists a driving of the vehicle based on a detected positional information; and a head-up display device that projects a display image on a projection area arranged on the vehicle to visually recognize a virtual image of the display image, the image processing device includes: an acquisition device that acquires the positional information; and a generation device that generates the display image including a predetermined display element. The generation device generates the display image to visually recognize the display element at a position associated with the positional information acquired by the acquisition device and to visually recognize the display element as a shape inclined toward the vehicle from the lane marking.

According to the above image processing device, the display element is visually recognized at the position associated with the positional information of the lane marking detected by the driving assistance device. Thus, the position of the display element changes in conjunction with a change of the positional information. That is, when the relative position of the lane marking with respect to the vehicle fluctuates in the vehicle width direction while the vehicle travels, the display element can be displayed as if the display element also fluctuated in the vehicle width direction in response to the fluctuation of the relative position. Further, the above invention displays the display element by the head-up display device. Thus, the display element (virtual image) is visually recognized as being superimposed on the traveling road (real image) which is visually recognized in front of a windshield. Therefore, since the display element which is visually recognized in a superimposed manner changes its position in conjunction with the positional information in this manner, it becomes easy for a driver to intuitively recognize that the driving assistance device is in an active state.

Further, according to the above image processing device, the display element is visually recognized as the shape that is inclined toward the vehicle from the lane marking. Thus, the inclination of the display element makes it easy for a viewer to visualize an image of the vehicle guided or restricted to the inside of the lane marking. Therefore, it becomes easy for a driver to intuitively recognize that the driving assistance device is in an active state such that driving of the vehicle is assisted on the basis of the positional information of the lane marking.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinbelow, a plurality of embodiments for carrying out the disclosure will be described with reference to the drawings. In each of the embodiments, a part corresponding to an item described in the preceding embodiment is denoted by the same reference sign as the already described item, and repetitive description may be omitted. In each of the embodiments, when only a part of a configuration is described, the other preceding embodiments can be referred to and applied to the other part of the configuration.

First Embodiment

Figure 1:
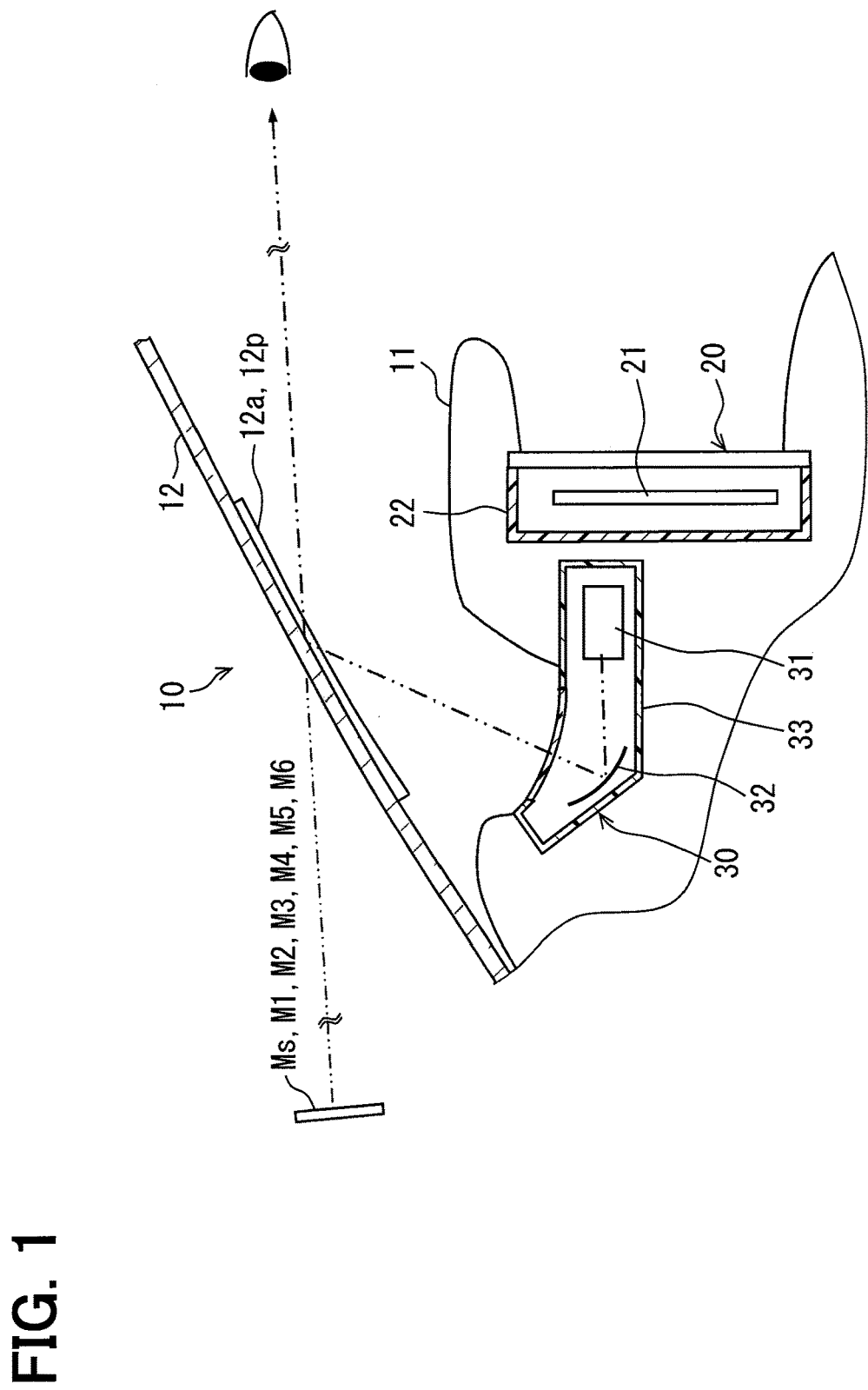
FIG. 1 is a sectional view illustrating a vehicle-mounted position of a head-up display device which is provided in a driving assistance system to which an image processing device is applied in a first embodiment of the present disclosure.

As illustrated in FIG. 1, a display device 20 and a head-up display device (HUD 30) are attached to an instrument panel 11 which is installed in a cabin of a vehicle 10. The display device 20 includes a liquid crystal panel 21 which is housed in a case 22. The display device 20 is disposed in front of a driver of the vehicle 10 (refer to FIG. 2). The liquid crystal panel 21 displays various warning indications and a vehicle speed.

The HUD 30 includes a liquid crystal panel 31 and a reflecting mirror 32 which are housed in a case 33. The HUD 30 is disposed below a windshield 12 which is located in front of the driver. Light of a display image emitted from the liquid crystal panel 31 is reflected by the reflecting mirror 32. Reflected light reflected by the reflecting mirror 32 is projected on a projection area 12p which is formed in the vehicle 10. The projection area 12p is formed by a reflecting sheet 12a which is attached to the interior side of the windshield 12. Accordingly, a virtual image of the display image is visually recognized by the driver of the vehicle 10. Specifically, the virtual image is visually recognized at the front side of the vehicle 10 (outside the cabin) with respect to the windshield 12.

Figure 2:
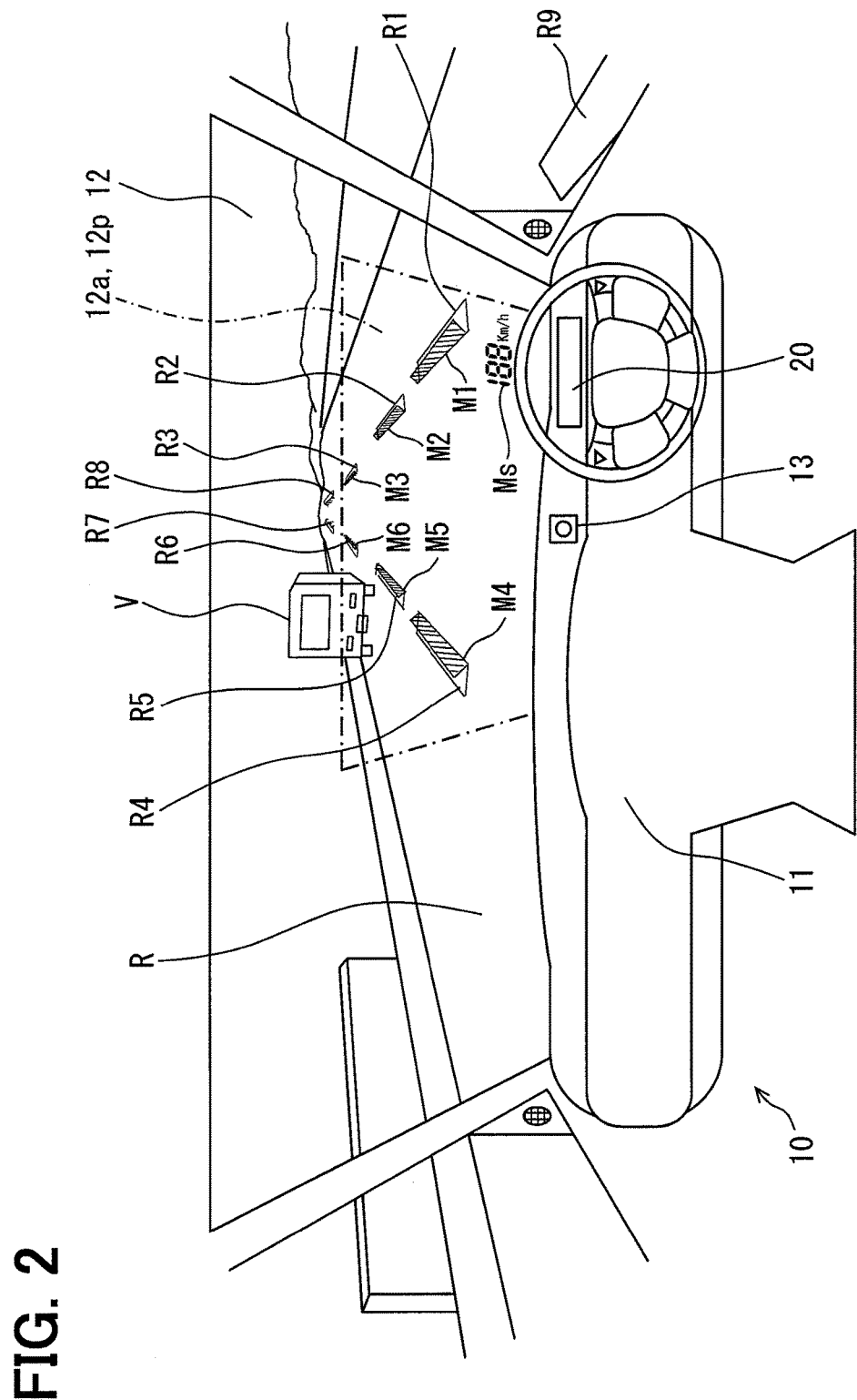
FIG. 2 is a diagram illustrating the relationship between a background that is within sight from the interior side of a windshield and a position where a display image is visually recognized in the first embodiment.

FIG. 2 illustrates the positional relationship between scenery that is within sight in front of the vehicle 10 through the windshield 12 and a virtual image formed by the HUD 30 at an angle of an eye point of the driver. An example of FIG. 2 shows a condition in which the vehicle 10 is traveling on an expressway with three lanes. Specifically, the vehicle 10 is traveling on the central one of the three lanes in a traveling road R. Another vehicle V is within sight on the front of the left lane. Further, the traveling road R is provided with a plurality of lane markings R1, R2, R3, R4, R5, R6, R7, R8, R9 which demarcate the three lanes. The lane markings R1, R2, R3, R8, R9 demarcate the center lane and the right lane and are formed at regular intervals with a predetermined pitch in a traveling direction. The lane markings R4, R5, R6, R7, R8 demarcate the center lane and the left lane and are formed at regular intervals with a predetermined pitch in the traveling direction.

A display image (virtual image) formed by the HUD 30 includes a vehicle speed display element Ms which indicates the vehicle speed and predetermined display elements M1, M2, M3, M4, M5, M6 (described below). The display elements M1 to M6 are located above the vehicle speed display element Ms and visually recognized in a view field region above a hood (not illustrated) of the vehicle 10. In addition to the vehicle speed display element Ms, concrete examples of the display element included in the display image include an indication display of a traveling direction of the vehicle 10 by a navigation device and various warning displays.

Figure 3:
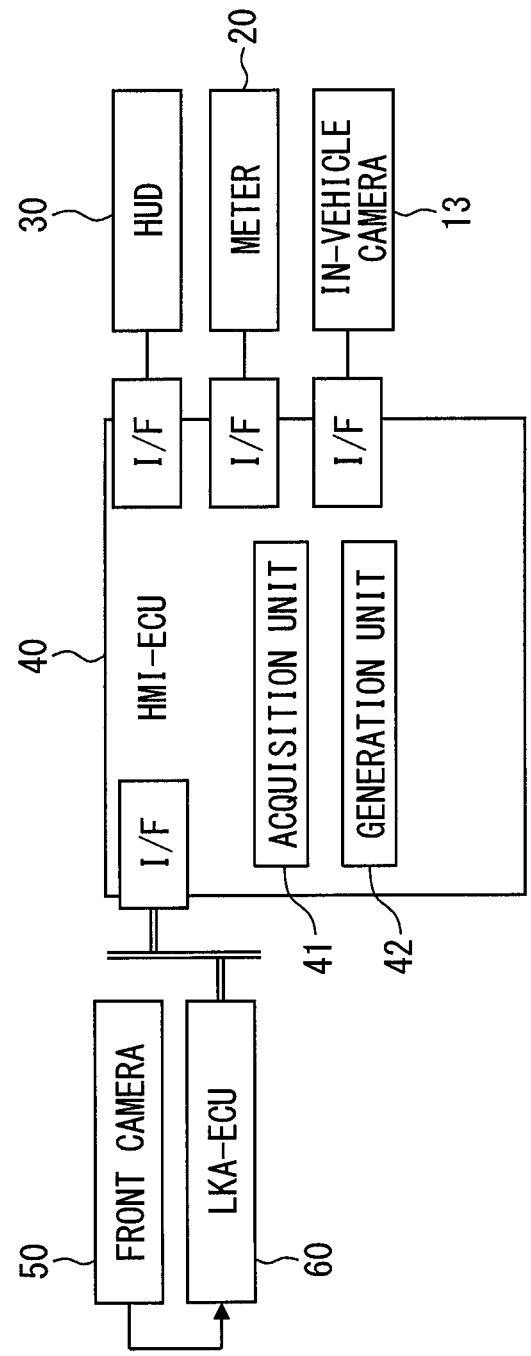
FIG. 3 is a block diagram illustrating the driving assistance system and the image processing device according to the first embodiment.

An electronic control unit (ECU 40) illustrated in FIG. 3 is mounted on the vehicle 10 and constitutes a display system together with the display device 20 and the HUD 30. The ECU 40 controls operations of the display device 20 and the HUD 30. For example, the ECU 40 acquires vehicle speed information through a local area network in the vehicle, and performs control on the basis of the acquired vehicle speed information so that the display device 20 and the HUD 30 display a vehicle speed. The ECU 40 is provided with a memory such as a ROM or a RAM, a CPU, an I/O, and a bus which connects these members. Some or all of functions executed by the ECU 40 may be configured as hardware by one or more ICs.

An in-vehicle camera 13 which captures an image of the face of the driver is attached to the instrument panel 11. The ECU 40 analyzes a face image of the driver captured by the in-vehicle camera 13 and calculates an eyeball position (eye point position) of the driver. Then, a projection position of the display image is adjusted according to the eye point position obtained by the analysis so that a virtual image is visually recognized at a desired position. For example, the projection position of the vehicle speed display element Ms is adjusted so that the vehicle speed display element Ms is not superimposed on the steering wheel. Further, the projection positions of the display elements M1 to M6 are adjusted so that the display elements M1 to M6 are visually recognized as being superimposed on the lane markings R1 to R6. Note that an initial eye point position (initial position) may be analyzed before the driver sits on the driver's seat and starts driving, and the initial position may be continuously used during travel. Alternatively, the eye point position may be periodically analyzed and updated during travel.

A front camera 50 which captures an image of the front side and an electronic control unit (ECU 60) which functions as a lane keeping assist device are mounted on the vehicle 10. For example, in a traveling condition of FIG. 2, among the lane markings R1 to R9 which are formed on the traveling road R, the camera 50 captures an image of the lane markings R1 to R8 which are located in front of the vehicle.

The ECU 60 analyzes an image captured by the front camera 50 and calculates relative positions of the lane markings R1 to R6 with respect to the vehicle 10 and calculates the shapes and sizes of the lane markings R1 to R6. In the example of FIG. 2, the relative positions of the pair of lane markings R1 to R3 and R4 to R6 are detected by the ECU 60, and the ECU 60 executes driving assistance control (described below) on the basis of positional information indicating the relative positions. For example, it is determined, on the basis of the calculated positional information, whether the vehicle 10 has departed from the center lane against the intension of the driver or whether the possibility of departure is a predetermined possibility or more. When it is determined that the vehicle 10 has departed or the possibility of departure is high, the ECU 60 controls the operation of a steering device (not illustrate) so as to apply a steering force in the direction of preventing the departure.

For example, when a speed of reducing a relative distance with respect to one of the pair of lane markings R1 to R3 and R4 to R6, specifically, with respect to the lane marking R1 to R3 is a predetermined speed or more in a condition in which a direction indicator is not operated, it is determined that the possibility of departure from the lane marking R1 to R3 is high. Then, a steering force toward the other lane marking R4 to R6 is applied. Accordingly, when the vehicle 10 is about to depart to the right lane in the middle of traveling on the central line, a steering force is applied in the direction of pulling the vehicle 10 back to the center lane.

The ECU 60 when executing such control corresponds to a "driving assistance device" which detects the relative positions of the lane markings R1 to R6 with respect to the vehicle 10 and assists driving of the vehicle 10 on the basis of the detected positional information. The positional information calculated by the ECU 60 is transmitted to the ECU 40 through the local area network in the vehicle. The ECU 40 generates the display image described above on the basis of the acquired positional information.

The ECU 40 when functioning to acquire positional information from the driving assistance device corresponds to an acquisition device 41. The ECU 40 when functioning to generate a display image corresponds to a generation device 42. The ECU 40 transmits data of the generated display image to the liquid crystal panel 31 of the HUD 30 to control light of the display image emitted from the liquid crystal panel 31. That is, the ECU 40 corresponds to an "image processing device" which is applied to a driving assistance system provided with the HUD 30 and the ECU 60 and generates the display image.

Next, the predetermined display elements M1 to M6 included in the display image will be described in detail with reference to FIG. 4.

Figure 4:
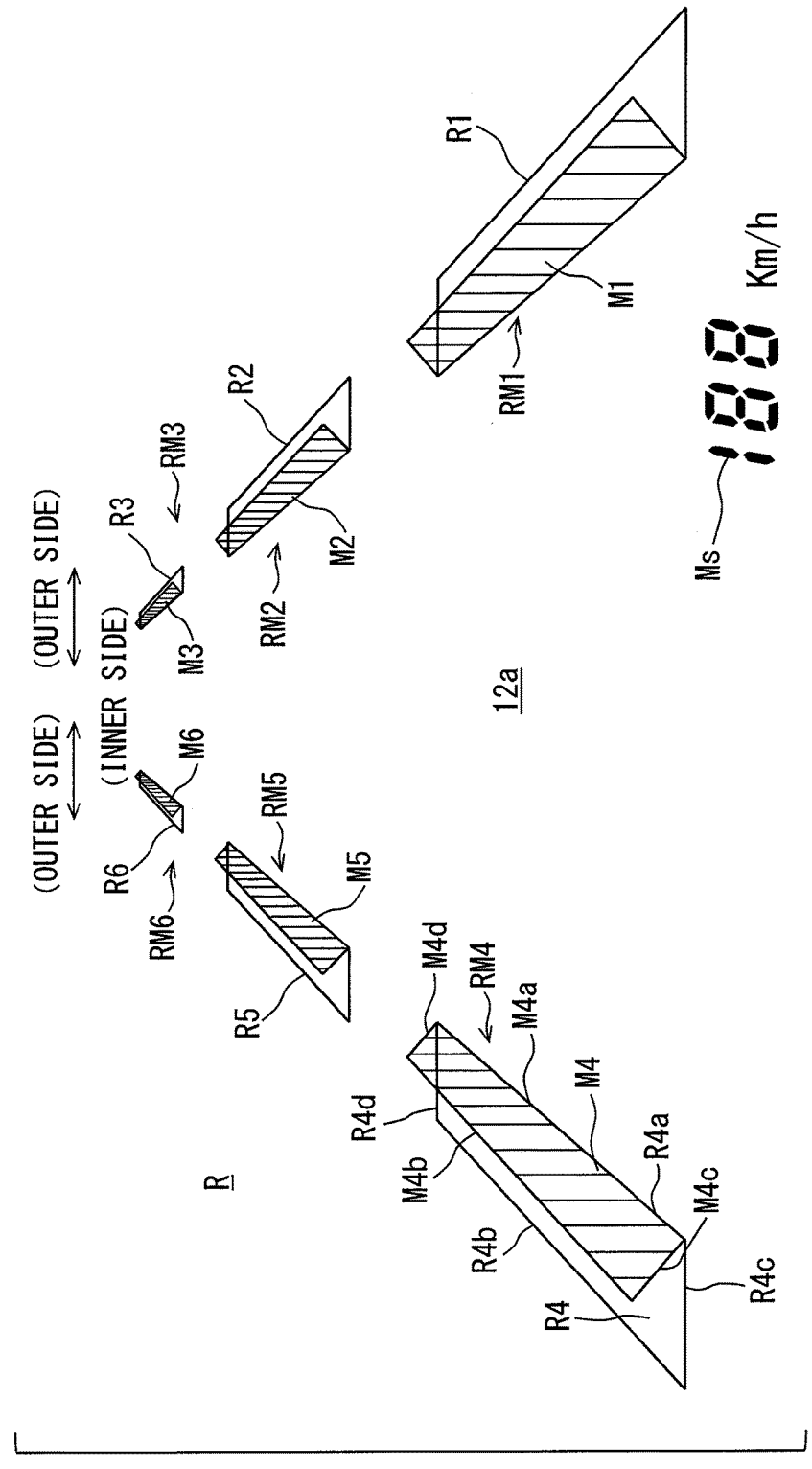
FIG. 4 is a diagram illustrating visual recognition positions of display elements (virtual images) with respect to lane markings (real images) in the first embodiment.

FIG. 4 represents a view from an eye point position which is analyzed in an image of the in-vehicle camera 13. Thus, for example, when the traveling road R on the front side is viewed while moving the eye point position rightward without changing a display image illustrated in FIG. 4, the display elements M1 to M6 are visually recognized as being shifted to the left side with respect to the lane markings R1 to R6. The generation device 42 generates the display image in such a manner that the display elements M1 to M6 and the lane markings R1 to R6 are visually recognized in a positional relationship illustrated in FIG. 4 when the front side of the vehicle is viewed from the analyzed eye point position.

That is, the display elements M1 to M6 are visually recognized as shapes inclined toward the vehicle 10 from the lane markings R1 to R6 in a direction (right-left direction) that is perpendicular to an extending direction of the lane markings R1 to R6 (front-rear direction) and horizontal. In other words, the display elements M1 to M6 are visually recognized as inclined planes whose height in the up-down direction is reduced toward the center of the lane from the lane markings R1 to R6.

Typically, each of the lane markings R1 to R6 has a rectangular shape whose longitudinal direction is aligned with the traveling direction, and each of the display elements M1 to M6 also has a rectangular shape whose longitudinal direction is aligned with the traveling direction correspondingly. Hereinbelow, the positional relationship between the lane marking R4 and the display element M4 will be described in detail. Note that the same applies to the positional relationship between the other lane markings R1 to R3, R5, R6 and the other display elements M1 to M3, M5, M6, and description thereof will be omitted. Further, FIG. 4 represents a view in an ideal state in which there is no deviation in detection of the eye point position and detection of the lane markings R1 to R6. However, in practice, there is a deviation between these detected positions and actual positions. Thus, the display elements M1 to M6 are viewed at positions shifted from the positions illustrated in FIG. 4.

A visible outline of the lane marking R4 at the side (the inner side) corresponding to the lane on which the vehicle 10 is traveling (an inner visible outline R4a) and a visible outline of the display element M4 at the inner side (an inner visible outline M4a) are located at the same position. That is, the two inner visible outlines R4a, M4a are located at the same position in the right-left direction. The two inner visible outlines R4a, M4a have the same length. The two inner visible outlines R4a, M4a are parallel to each other.

A visible outline of the lane marking R4 at the outer side (an outer visible outline R4b) and a visible outline of the lane marking M4 at the outer side (an outer visible outline M4b) are located at different positions in the right-left direction. Specifically, the outer visible outline M4b of the display element M4 is located inside the outer visible outline R4b of the lane marking R4. The two outer visible outlines R4b, M4b have the same length. The two outer visible outlines R4b, M4b are parallel to each other.

A visible outline of the lane marking R1 at the near side (a near side visible outline R4c) and the lower end of the inner visible outline M4a of the display element M4 are located at the same position in the up-down direction. A visible outline of the lane marking R4 at the far side (a far side visible outline R4d) and the upper end of the inner visible outline M4a of the display element M4 are located at the same position in the up-down direction.

A visible outline of the display element M4 at the lower side (a lower visible outline M4c) is not parallel to the near side visible outline R4c of the lane marking R4. The outer end of the lower visible outline M4c of the display element M4 is located above the inner end thereof. Thus, the lower visible outline M4c is visually recognized as a line that is inclined downward toward the inner side.

A visible outline of the display element M4 at the upper side (an upper visible outline M4d) is not parallel to the far side visible outline R4d of the lane marking R4. The outer end of the upper visible outline M4d of the display element M4 is located above the inner end thereof. Thus, the upper visible outline M4d is visually recognized as a line that is inclined downward toward the inner side.

In this manner, the inner visible outline M4a and the outer visible outline M4b of the display element M4 are visually recognized as lines that are parallel to the lane marking R4. On the other hand, the lower visible outline M4c and the upper visible outline M4d of the display element M4 are visually recognized as inclined lines. Thus, the entire display element M4 is visually recognized as an inclined plane that is inclined downward toward the inner side. Note that a part (the half or more) of the display element M4 is visually recognized as being superimposed on the lane marking R4.

Further, the display element M4 is visually recognized as the inclined plane with the inner visible outline M4a of the display element M4 aligned with the inner visible outline R4a of the lane marking R4. Thus, a virtual three-dimensional object RM4 which includes the display element M4 as a first virtual plane and the lane marking R4 as a second virtual plane is visually recognized. That is, the display element M4 which is a virtual image and the lane marking R4 which is a real image are integrated so as to be visually recognized as one virtual three-dimensional object RM4 by an optical illusion. The second virtual plane is visually recognized as the bottom face of the virtual three-dimensional object RM4 which is placed on the traveling road R, and the first virtual plane is visually recognized as an inclined plane projecting upward from the traveling road R by an optical illusion.

In the example of FIG. 4, the plurality of lane markings R1 to R6 are formed at a predetermined pitch in the traveling direction of the traveling road R. Correspondingly, the plurality of display elements M1 to M6 are also visually recognized as being arranged at the predetermined pitch in the traveling direction. Further, the pair of lane markings 121 to R3 and R4 to R6 are located on the right and left sides of the vehicle 10. Correspondingly, the plurality of display elements M1 to M6 are also visually recognized on the right and left sides of the vehicle 10.

As the vehicle 10 travels, a background including the traveling road R which is within sight at the exterior side of the windshield 12 is visually recognized as if the background flew from the front side of the vehicle 10 toward the rear side thereof. That is, lane markings that are located at positions indicated by R3, R6 in FIG. 4 at a first point approach the vehicle 10 in such a manner that the lane markings move to positions of R2, R5 at a second point thereafter and then move to positions of R1, R4 at a third point thereafter. Further, display positions of the plurality of display elements M1 to M6 are also changed corresponding to such a relative position change of the lane markings R1 to R6. Further, the display elements M1 to M6 are displayed in a manner to be gradually enlarged as time passes. The enlarging speed is equal to an approaching speed of the lane markings R1 to R6. Thus, the display elements M1 to M6 are visually recognized as if the display elements M1 to M6 approached the driver together with the lane markings R1 to R6 as the lane markings R1 to R6 approach the vehicle 10. Further, the display elements M1 to M6 are visually recognized as if the display elements M1 to M6 approached the driver with the same speed as the lane markings R1 to R6.

An inner region surrounded by the visible outlines M4a, M4b, M4c, M4d of each of the display elements M1 to M6 is displayed in a predetermined color. In the example of FIG. 4, each of the visible outlines M4a, M4b, M4c, M4d (contours) and the inner region are displayed in different colors.

As described above, according to the present embodiment, the acquisition device 41 which acquires positional information of the lane markings R1 to R6 and the generation device 42 which generates the display image including the predetermined display elements M1 to M6 are provided. The generation device 42 generates the display image in such a manner that the display elements M1 to M6 are visually recognized at positions associated with the acquired positional information and visually recognized as shapes inclined toward the vehicle from the lane markings R1 to R6.

According to this configuration, the display elements M1 to M6 are visually recognized at the positions associated with the positional information of the lane markings R1 to R6 detected by the ECU 60 which functions as the driving assistance device. Thus, the positions of the display elements M1 to M6 change in conjunction with a change of the positional information. Further, the display elements M1 to M6 are displayed by the HUD 30. Thus, the display elements M1 to M6 (virtual images) are visually recognized as being superimposed on the traveling road R (real image) which is visually recognized in front of the windshield 12. Therefore, since the positions of the display elements M1 to M6 which are visually recognized in a superimposed manner change in conjunction with the positional information in this manner, it becomes easy for the driver to intuitively recognize that the driving assistance device is in an active state.

Further, according to the present embodiment, the display elements M1 to M6 are visually recognized as shapes inclined toward the vehicle 10 from the lane markings R1 to R6. Thus, the inclination of the display elements M1 to M6 makes it easy for a viewer to visualize an image of the vehicle 10 guided or restricted to the inside of the lane markings R1 to R6. Therefore, it becomes easy for the driver to intuitively recognize that the driving assistance device is in an active state.

The active state is a standby state that, when the ECU 60 normally detects the lane markings R1 to R6 and departure or a high possibility of departure is determined, enables application of a steering force in the direction of preventing the departure. An inactive state is a state unable to detect the lane markings R1 to R6 such as when the lane markings R1 to R6 are not present on the traveling road R, when the lane markings R1 to R6 partially peel off, or when there is a foreign substance such as sand on the lane markings R1 to R6.

Further, in the present embodiment, the generation device 42 generates the display image in such a manner that the display elements M1 to M6 are visually recognized as approaching the driver as the lane markings R1 to R6 approach the vehicle 10 along with the travel of the vehicle 10. This facilitates a natural view of the display elements M1 to M6 (virtual images) blending into the traveling road R (real image) which is visually recognized in front of the windshield 12. Thus, it is possible to reduce the possibility of the driver feeling uncomfortable with the display elements M1 to M6 displayed at positions that overlap the traveling road R.

Further, in the present embodiment, the generation device 42 generates the display image in such a manner that each of the display elements M1 to M6 (virtual images) is visually recognized as the first virtual plane, each of the lane markings R1 to R6 (real images) is visually recognized as the second virtual plane, and the virtual three-dimensional objects RM1 to RM6 each of which includes the first virtual plane and the second virtual plane are visually recognized. Thus, the virtual three-dimensional objects RM1 to RM6 are visually recognized as shapes inclined toward the vehicle 10 from the lane markings R1 to R6. This enables facilitation of the effect of making it easy for the driver to intuitively recognize operation contents of the driving assistance device.

Further, in the present embodiment, the generation device 42 generates the display image in such a manner that the display elements M1 to M6 are visually recognized as being superimposed on the lane markings R1 to R6. Thus, in the background including the traveling road R which is within sight at the exterior side of the windshield 12, a range in which the display elements M1 to M6 are superimposed on a part other than the lane markings R1 to R6 (the other background part) can be reduced. Thus, it is possible to prevent the other background part from becoming hard to see by the display elements M1 to M6 and to improve the visibility with respect to the other background part.

Further, in the present embodiment, when the plurality of lane markings R1 to R6 are formed at a predetermined pitch in the traveling direction of the traveling road R, the generation device 42 generates the display image in such a manner that the plurality of display elements M1 to M6 are visually recognized as being arranged at the predetermined pitch in the traveling direction. Thus, it is possible to reduce the range in which the display elements M1 to M6 are superimposed on the other background part and to improve the visibility with respect to the other background part.

Further, in the present embodiment, when the driving assistance device detects the pair of lane markings R1 to R3 and R4 to R6 which are located on the right and left sides of the vehicle 10, the generation device 42 generates the display image in such a manner that the display elements M1 to M3 are visually recognized with respect to the lane marking R1 to R3 and the display elements M4 to M6 are visually recognized with respect to the lane marking R4 to R6. Accordingly, the inclination of the display elements M1 to M3 and M4 to M6 makes it easy for a viewer to visualize an image of the vehicle 10 guided or restricted from both the right and left sides of the vehicle 10. Thus, it is possible to facilitate the above effect of making it easy to intuitively recognize the active state of the driving assistance device.

Second Embodiment

Figure 5:
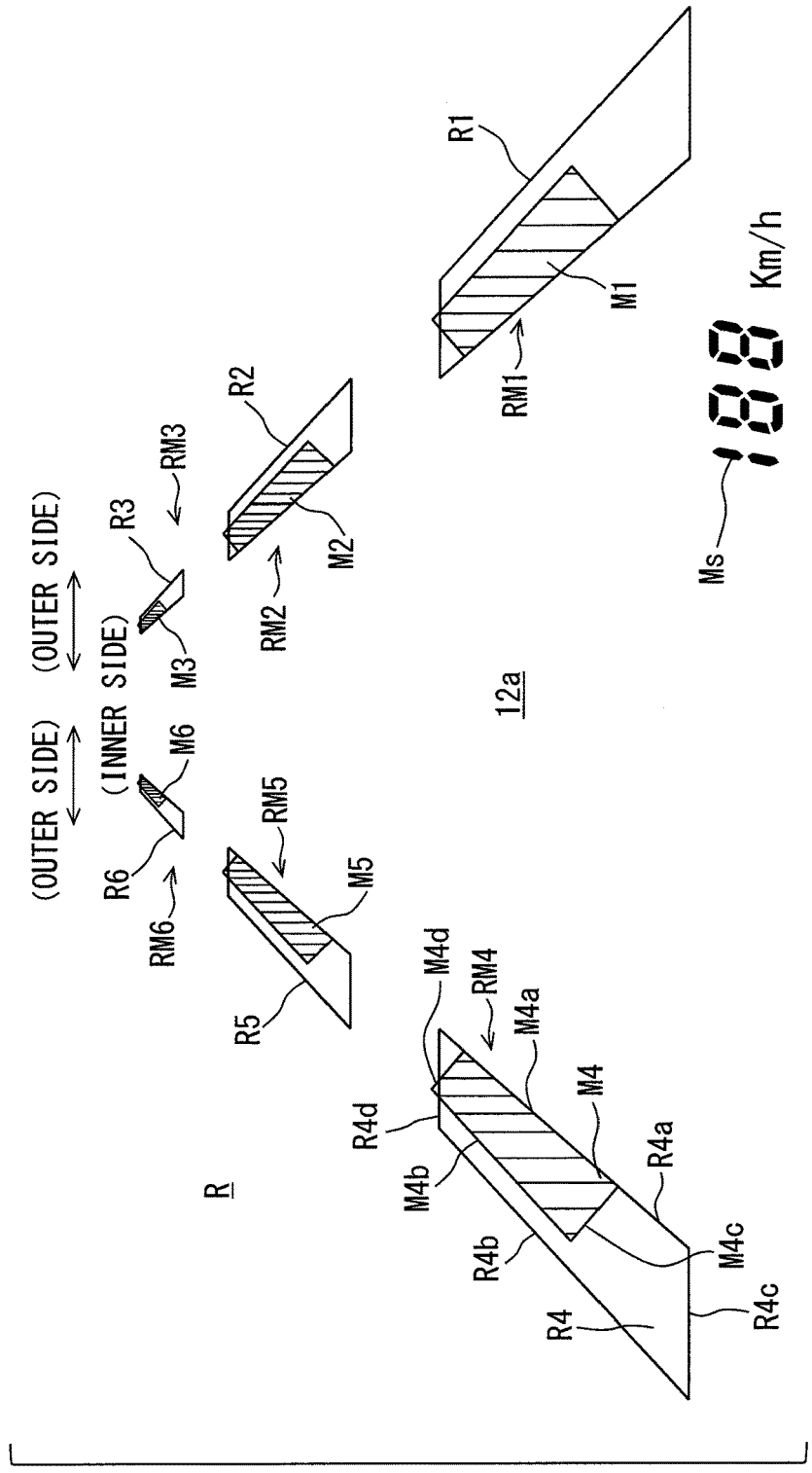
FIG. 5 is a diagram illustrating visual recognition positions of display elements (virtual images) with respect to lane markings (real images) in a second embodiment of the present disclosure.

In the first embodiment, the display image is generated in such a manner that the length of the inner visible outline R4a of the lane marking R4 and the length of the inner visible outline M4a of the display element M4 are visually recognized as being equal to each other. On the other hand, in the present embodiment illustrated in FIG. 5, a display image is generated in such a manner that the length of the inner visible outline M4a of the display element M4 is visually recognized as being shorter than the length of the inner visible outline R4a of the lane marking R4.

Specifically, the lower end of the inner visible outline M4a of the display element M4 is visually recognized above the near side visible outline R4c of the lane marking R4. Further, the upper end of the inner visible outline M4a of the display element M4 is visually recognized below the far side visible outline R4d of the lane marking R4.

According to this configuration, eve when there is a little deviation in detection of the eye point position and detection of the lane markings R1 to R6, the deviation does not change a view in which the inner visible outline M4a is present between the near side visible outline R4c and the far side visible outline R4d. Thus, a change in the view caused by a detection deviation is less likely to occur, and the robustness of the view with respect to a detection deviation can be improved.

Third Embodiment

Figure 6:
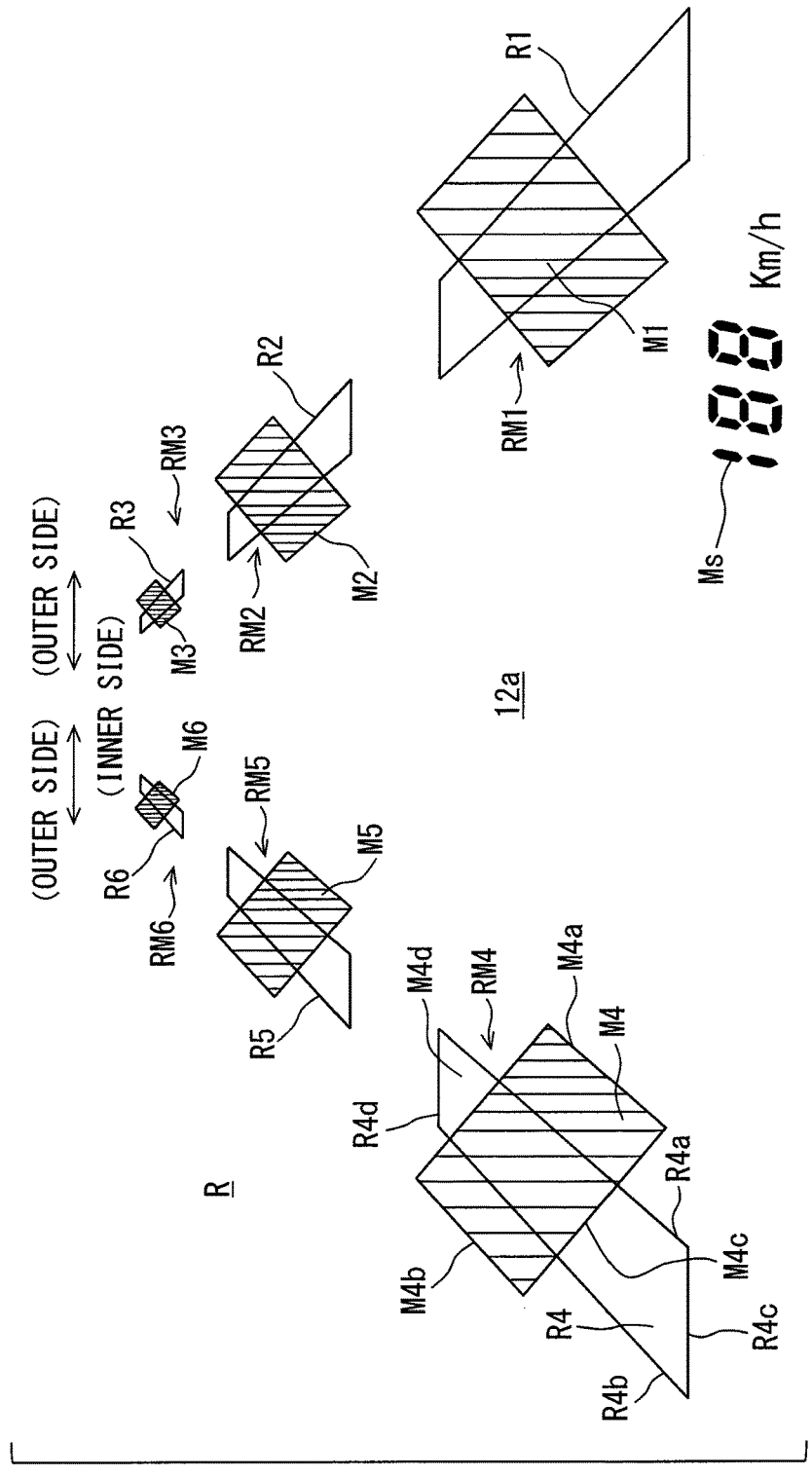
FIG. 6 is a diagram illustrating visual recognition positions of display elements (virtual images) with respect to lane markings (real images) in a third embodiment of the present disclosure.

In the first embodiment, the position of the inner visible outline R4a of the lane marking R4 is aligned with the position of the inner visible outline M4a of the display element M4 in the direction (right-left direction) perpendicular to the traveling direction. On the other hand, in the present embodiment illustrated in FIG. 6, a display image is generated in such a manner that the inner visible outline M4a of the display element M4 is visually recognized on the inner side relative to the inner visible outline R4a of the lane marking R4 in the right-left direction.

Further, in the first embodiment, the display image is generated in such a manner that the outer visible outline M4b of the display element M4 is visually recognized on the inner side relative to the outer visible outline R4b of the lane marking R4 in the right-left direction. On the other hand, in the present embodiment illustrated in FIG. 6, the display image is generated in such a manner that the outer visible outline M4b of the display element M4 is visually recognized on the outer side relative to the outer visible outline R4b of the lane marking R4 in the right-left direction.

As described above, according to the present embodiment, the length in the right-left direction of the display element M4 is visually recognized as being longer than the length in the right-left direction of the lane marking R4, and the display element M4 is visually recognized as being superimposed across the lane marking R4 in the right-left direction. Thus, even when there is a little deviation in detection of the eye point position and detection of the lane markings R1 to R6, the deviation does not change the view. Thus, a change in the view caused by a detection deviation is less likely to occur, and the robustness of the view with respect to a detection deviation can be improved. Further, since the display element M4 is visually recognized as being superimposed across the lane marking R4 in the right-left direction, it becomes easy for a driver to recognize that the display element M4 is displayed in association with the position of the lane marking R4.

Fourth Embodiment

Figure 7:
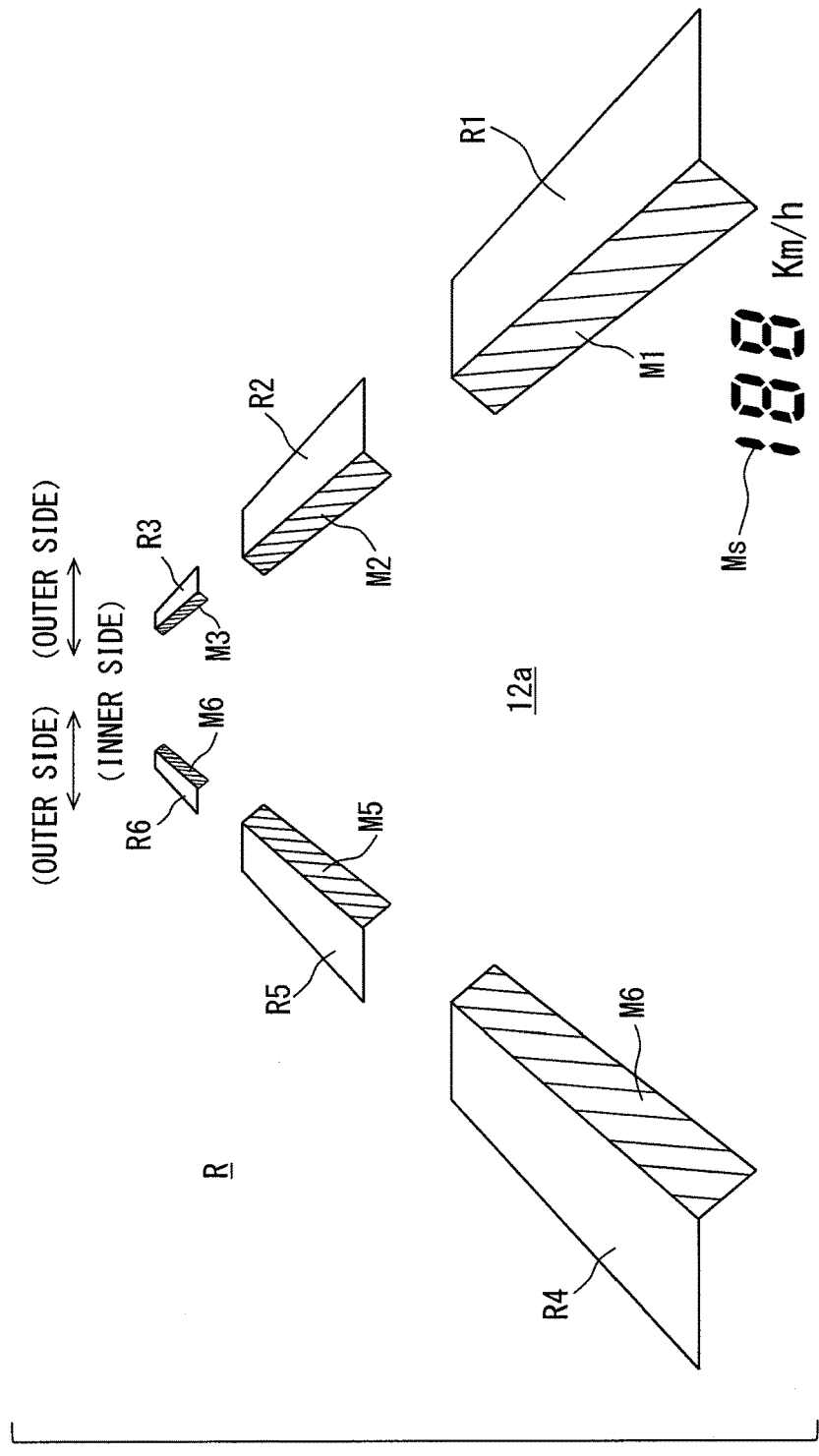
FIG. 7 is a diagram illustrating visual recognition positions of display elements (virtual images) with respect to lane markings (real images) in a fourth embodiment of the present disclosure.

In the first embodiment, the second virtual plane of the virtual three-dimensional object RM4 is visually recognized as the bottom face of the virtual three-dimensional object RM4 which is placed on the traveling road R, and the first virtual plane of the virtual three-dimensional object RM4 is visually recognized as an inclined plane projecting upward from the traveling road R by an optical illusion. On the other hand, in the present embodiment illustrated in FIG. 7, the second virtual plane of the virtual three-dimensional object RM4 is visually recognized as the bottom face of the virtual three-dimensional object RM4 which is placed on the traveling road R, and the first virtual plane of the virtual three-dimensional object RM4 is visually recognized as an inclined plane recessed downward from the traveling road R by an optical illusion.

Specifically, the inner visible outline R4a of the lane marking R4 and the outer visible outline M4b of the display element M4 are located at the same position in the right-left direction. The inner visible outline R4a and the outer visible outline M4b have the same length and are parallel to each other. The inner visible outline M4a and the outer visible outline M4b of the display element M4 are visually recognized as lines that are parallel to the lane marking R4. On the other hand, the lower visible outline M4c and the upper visible outline M4d of the display element M4 are visually recognized as inclined lines. Thus, the entire display element M4 is visually recognized as an inclined plane that is inclined downward toward the inner side.

Fifth Embodiment

Figure 8:
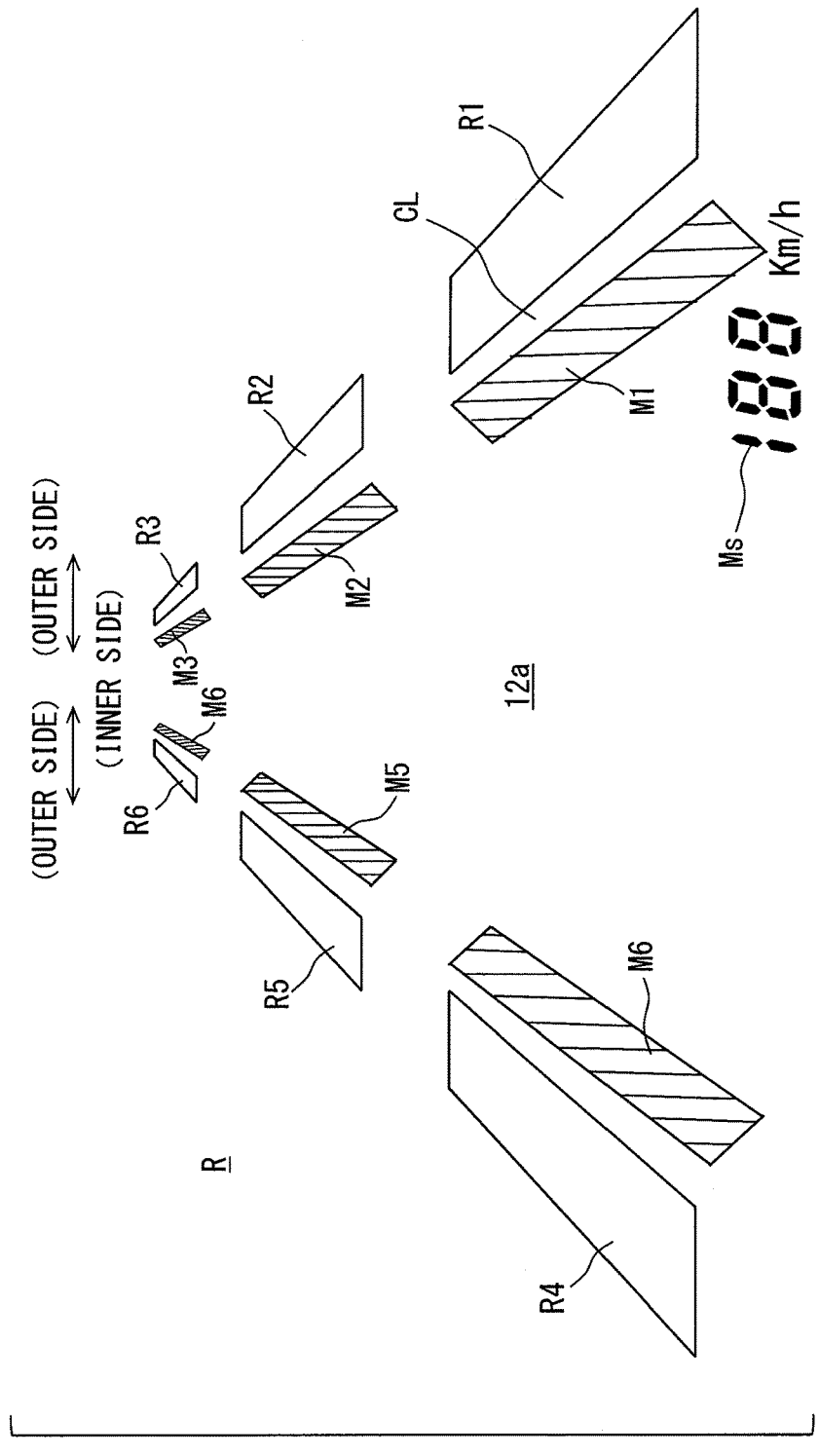
FIG. 8 is a diagram illustrating visual recognition positions of display elements (virtual images) with respect to lane markings (real images) in a fifth embodiment of the present disclosure.

In the fourth embodiment, the inner visible outline R4a of the lane marking R4 and the outer visible outline M4b of the display element M4 are located at the same position in the right-left direction. On the other hand, in the present embodiment illustrated in FIG. 8, the outer visible outline M4b of the display element M4 is visually recognized on the inner side relative to the inner visible outline R4a of the lane marking R4 in the right-left direction. That is, the display element M4 and the lane marking R4 are visually recognized with a gap CL present between the inner visible outline R4a and the outer visible outline M4b so that the display element M4 and the lane marking R4 are not superimposed on each other. Note that it is desired that the display elements M1 to M6 be visually recognized as being located in a region between the vehicle 10 and the lane marking R4.

Sixth Embodiment

Figure 9:
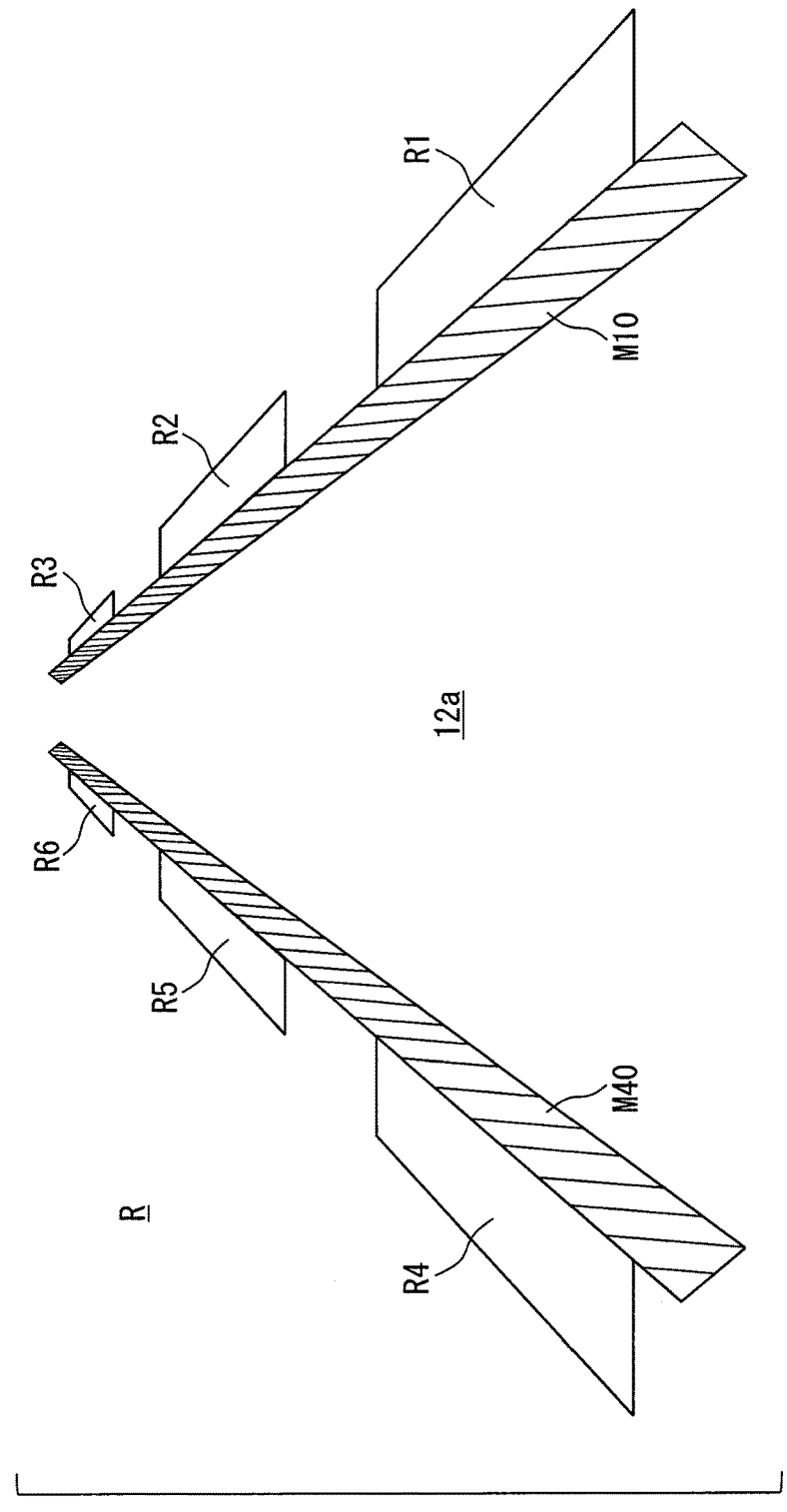
FIG. 9 is a diagram illustrating visual recognition positions of display elements (virtual images) with respect to lane markings (real images) in a sixth embodiment of the present disclosure.

In the fourth embodiment, when the plurality of lane markings R1 to R3, R4 to R6 are formed in the traveling direction, as many display elements M1 to M3, M4 to M6 as the lane markings R1 to R3, R4 to R6 are displayed so as to be visually recognized. On the other hand, in the present embodiment illustrated in FIG. 9, a display element M10 which extends in the traveling direction is displayed so as to be visually recognized with respect to the plurality of lane markings R1 to R3 which are arranged in the traveling direction, and a display element M40 which extends in the traveling direction is displayed so as to be visually recognized with respect to the plurality of lane markings R4 to R6 which are arranged in the traveling direction.

According to this configuration, even when there is a deviation in the traveling direction in detection of the eye point position and detection of the lane markings R1 to R6, the deviation hardly changes a view of the positions of the display elements M10, M40 with respect to the lane markings R1 to R6. Thus, a change in the view caused by a detection deviation is less likely to occur, and the robustness of the view with respect to a detection deviation can be improved.

Seventh Embodiment

In each of the above embodiments, the display positions of the display elements M1 to M6 are changed in response to the approach of the lane markings R1 to R6 to the vehicle 10 along with the travel of the vehicle. Thus, as the lane markings R1 to R6 approach the vehicle 10, the display positions of the display elements M1 to M6 in the traveling direction are changed so that the display elements M1 to M6 are visually recognized as if the display elements M1 to M6 approached a driver. On the other hand, in the present embodiment, the display positions in the traveling direction are displayed in a fixed manner. However, the display positions are changed according to the positions of the lane markings R1 to R6 in the right-left direction.

In short, in the present embodiment, the generation device 42 generates a display image in such a manner that, even when the lane markings R1 to R6 approach the vehicle 10 as the vehicle 10 travels, a distance between a driver of the vehicle 10 and the display elements M1 to M6 is visually recognized as being kept constant. Accordingly, the display elements M1 to M6 do not move up and down. Thus, it is possible to reduce the possibility of the driver feeling uncomfortable with movement of the display elements M1 to M6.

Eighth Embodiment

As described above in the first embodiment, the driving assistance device may fall into an inactive state. For example, the inactive state is a state unable to detect the lane markings R1 to R6 such as when the lane markings R1 to R6 are not present on the traveling road R, when the lane markings R1 to R6 partially peel off, or when there is a foreign substance such as sand on the lane markings R1 to R6. On the other hand, even in an active state which is able to detect the lane markings R1 to R6, the accuracy of detection may be deteriorated due to a degree of peeling off of the lane markings R1 to R6 or a degree of the foreign substance.

In the present embodiment, in an active state, the shape of each of the display elements M10, M40 is varied according to the detection accuracy of the lane markings R1 to R6. Specifically, the ECU 40 or the ECU 60 calculates a numerical value to be an index of the detection accuracy as a recognition rate. The generation device 42 generates a display image in such a manner that a virtual three-dimensional object having a steeper inclination angle of the display elements M10, M40 is visually recognized as the calculated recognition rate becomes higher. The virtual three-dimensional object is visually recognized with virtual band-shaped objects formed of the two display elements M10, M40 arranged side by side on the right and left sides by an optical illusion.

Figure 10:
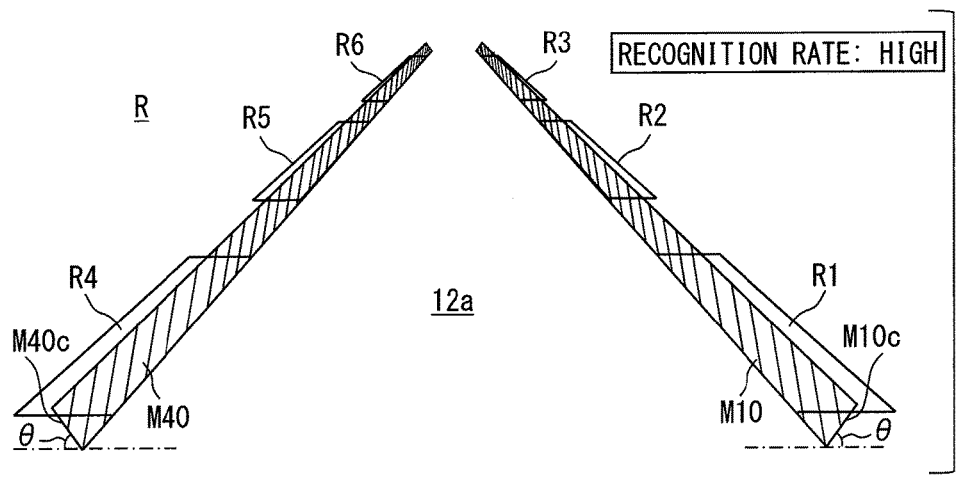
FIG. 10 is a diagram illustrating the shapes of display elements when the recognition rate of lane markings is high in an eighth embodiment of the present disclosure.
Figure 11:
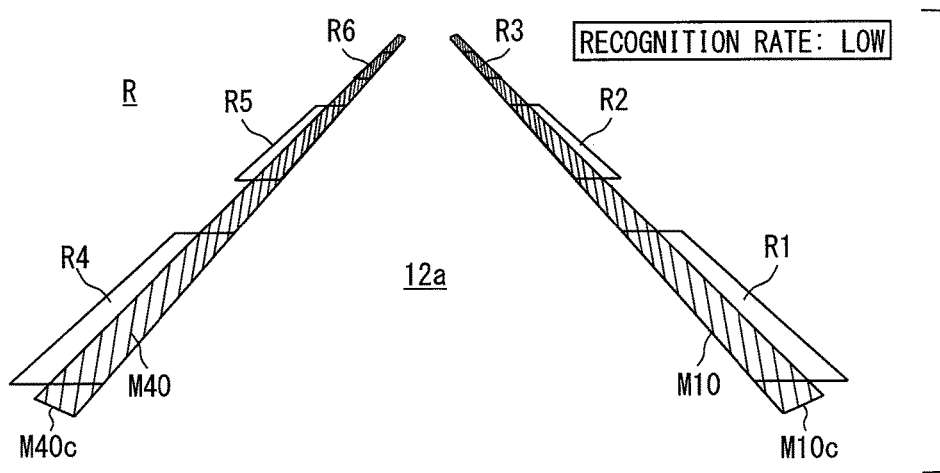
FIG. 11 is a diagram illustrating the shapes of display elements when the recognition rate of the lane markings is low in the eighth embodiment.

For example, the display elements M10, M40 are displayed in a mode of FIG. 10 when the recognition rate is equal to or more than a threshold and displayed in a mode of FIG. 11 when the recognition rate is less than the threshold. These display elements M10, M40 are the combination of FIG. 9 and FIG. 4. That is, similarly to FIG. 9, each of the display elements M10, M40 has a band shape extending in the traveling direction. Further, similarly to FIG. 4, each of the display elements M10, M40 has a shape that is visually recognized as an inclined plane extending upward from the traveling road R by an optical illusion.

Further, each of the display elements M10, M40 has a shape that is inclined in the direction of reducing the up-down direction height toward the vehicle 10 from the lane markings R1 to R6, and has a larger inclination angle θ as the calculated recognition rate becomes higher. In other words, the visible outline of each of the display elements M10, M40 forms a flat quadrangle. The inclination angle θ of the lower short side of the quadrangle (the lower visible outline M40C, M10C) with respect to the horizontal direction is made larger as the recognition rate becomes higher. Note that the inclination angle of each of the display elements M10, M40 is constant regardless of the recognition rate.

As described above, according to the present embodiment, the shape of each of the display elements M10, M40 is varied according to the detection accuracy of the lane markings R1 to R6. This makes it easy to intuitively recognize the detection accuracy with which the driving assistance device is operating.

A steeper inclination angle θ gives a user a stronger impression that the vehicle 10 is automatically controlled so as not to depart from the lane markings R1 to R6. In the present embodiment focusing on this point, the inclination angle θ of each of the display elements M10, M40 is made steeper as the detection accuracy becomes higher. Thus, the detection accuracy of the lane markings R1 to R6 by the driving assistance device, that is, the probability that the driving assistance device functions to apply a steering force in the direction of preventing departure is represented by a difference in the inclination angle θ of each of the display elements M10, M40. This makes it easy to intuitively recognize the probability.

Ninth Embodiment

Figure 12:
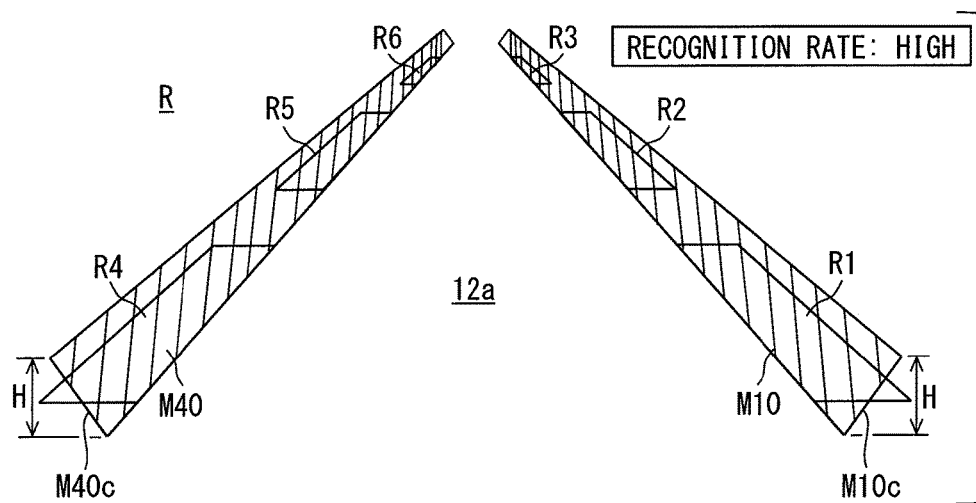
FIG. 12 is a diagram illustrating the shapes of display elements when the recognition rate of lane markings is high in a ninth embodiment of the present disclosure.
Figure 13:
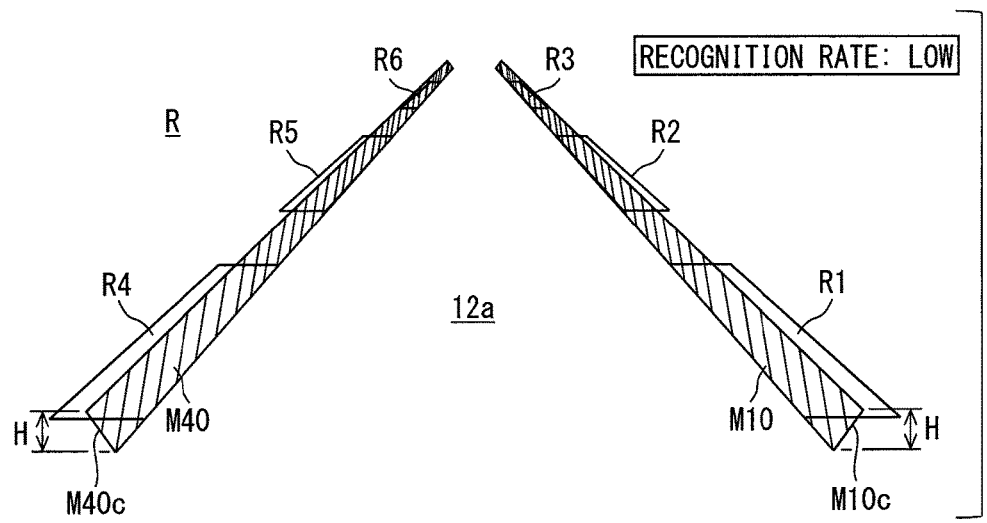
FIG. 13 is a diagram illustrating the shapes of display elements when the recognition rate of the lane markings is low in the ninth embodiment.

In the eighth embodiment, the inclination angle θ of each of the display elements M10, M40 is made steeper as the detection accuracy becomes higher. On the other hand, in the present embodiment, the up-down direction height of each of the display elements M10, M40 is made higher as the detection accuracy becomes higher. Specifically, when the recognition rate is equal to or more than a threshold, the up-down direction height of each of the display elements M10, M40 is increased as illustrated in FIG. 12. That is, the length in the short side of each of the display elements M10, M40 having a quadrangular shape is increased. On the other hand, when the recognition rate is lower than the threshold, the up-down direction height of each of the display elements M10, M40 is reduced as illustrated in FIG. 13.

Further, each of the display elements M10, M40 has a shape that is inclined in the direction of reducing the up-down direction height toward the vehicle 10 from the lane markings R1 to R6 and has a band shape extending in the traveling direction. The up-down direction height H of the band shape is set to be larger as the calculated recognition rate becomes higher. In other words, the length of each of the lower visible outlines M40C, M10C is made longer as the recognition rate becomes higher. Note that the inclination angle of each of the display elements M10, M40 is set constant regardless of the recognition rate.

A higher height of each of the display elements M10, M40 gives a user a stronger impression that the vehicle 10 is automatically controlled so as not to depart from the lane markings R1 to R6. In the present embodiment focusing on this point, the up-down direction height of each of the display elements M10, M40 is made higher as the detection accuracy becomes higher. Thus, the probability that the driving assistance device functions to apply a steering force in the direction of preventing departure is represented by a difference in the height of each of the display elements M10, M40. This makes it easy to intuitively recognize the probability.

Tenth Embodiment

Figure 14:
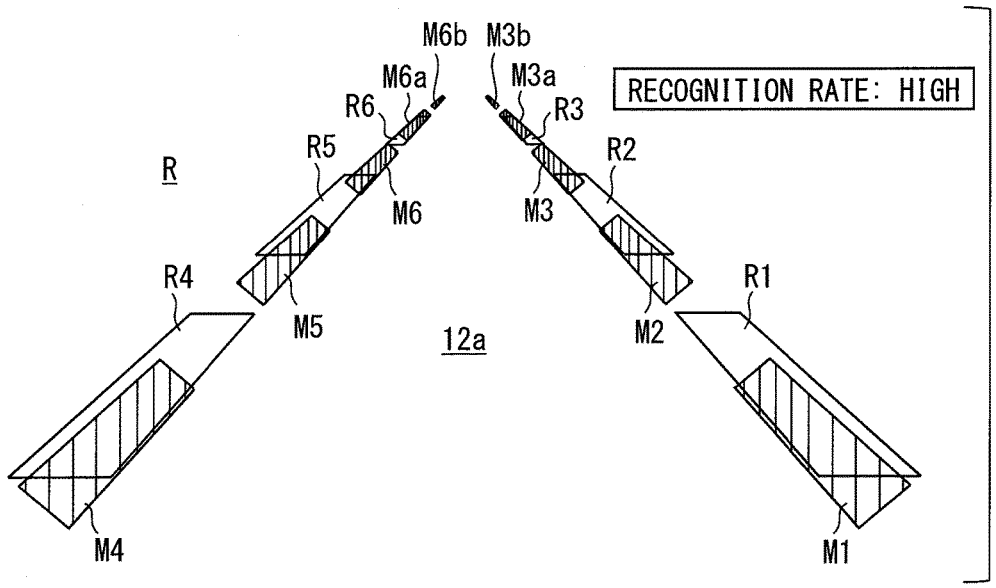
FIG. 14 is a diagram illustrating the number of display elements when the recognition rate of lane markings is high in a tenth embodiment of the present disclosure.
Figure 15:
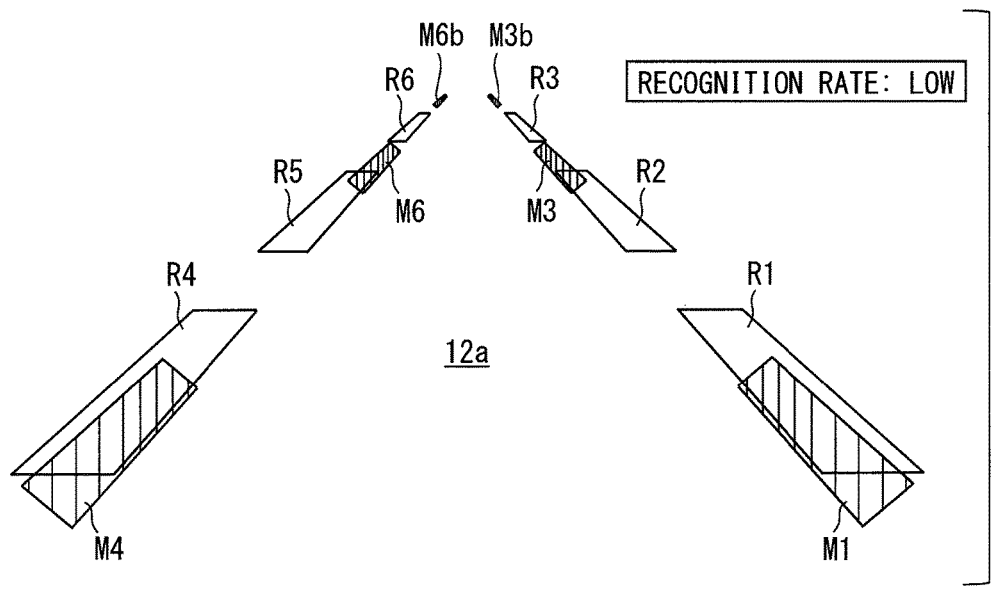
FIG. 15 is a diagram illustrating the number of display elements when the recognition rate of the lane markings is low in the tenth embodiment.

In the ninth embodiment, each of the display elements M10, M40 has a band shape extending in the traveling direction. On the other hand, in the present embodiment, similarly to the first embodiment, a plurality of display elements M1, M2, M3, M3a, M3b, M4, M5, M6, M6a, M6b are arranged side by side in the traveling direction. Further, an interval between the display elements M1 to M6b in the traveling direction is made shorter as the detection accuracy becomes higher. In other words, the number of display elements M1 to M6b is increased as the detection accuracy becomes higher. Specifically, when the recognition rate is equal to or more than a threshold, the interval is made shorter as illustrated in FIG. 14 to increase the number of display elements M1 to M6b. On the other hand, when the recognition rate is lower than the threshold, the interval is made longer as illustrated in FIG. 15 to reduce the number of display elements M1 to M6.

A shorter interval between the display elements M1 to M6b, that is, a larger number of display elements M1 to M6b gives a user a stronger impression that the vehicle 10 is automatically controlled so as not to depart from the lane markings R1 to R6. In the present embodiment focusing on this point, the interval between the display elements M1 to M6b is made shorter to increase the number of display elements M1 to M6b as the detection accuracy becomes higher. Thus, the probability that the driving assistance device functions to apply a steering force in the direction of preventing departure is represented by a difference in the interval between the display elements M1 to M6b and the number of display elements M1 to M6b. This makes it easy to intuitively recognize the probability.

Eleventh Embodiment

As described above in the first embodiment, a state unable to execute driving assistance due to circumstances such that the driving assistance device cannot detect the lane markings R1 to R6 is called an inactive state. Further, even in an active state in which the lane markings R1 to R6 are detected and driving assistance is executable, the driving assistance may be put on standby without starting the driving assistance when a user does not allow the start of the driving assistance. In the present embodiment, the shape of each of the display elements M10, M40 is varied between such a standby time and the above execution time when the driving assistance is executed. The execution time corresponds to the standby state described in the first embodiment.

Figure 16:
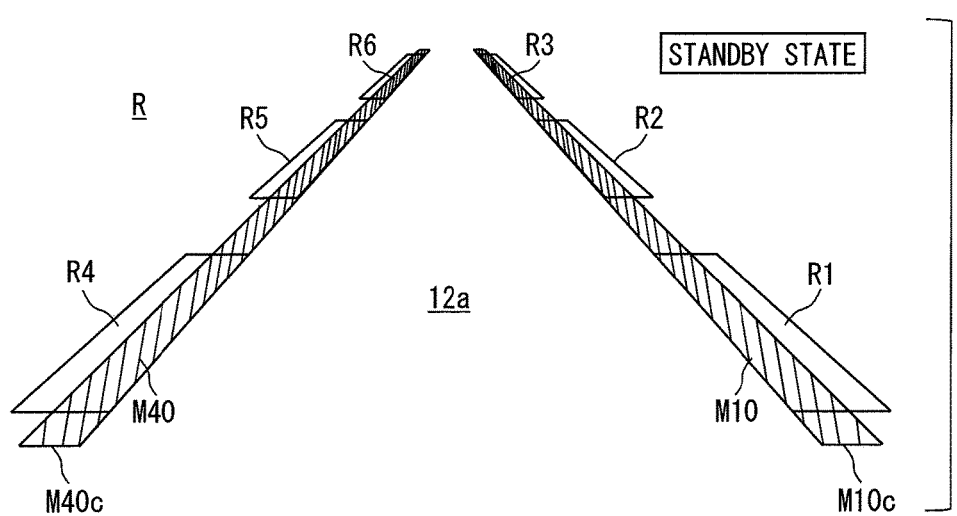
FIG. 16 is a diagram illustrating the shapes of display elements when driving assistance is in standby in an enabled state in an eleventh embodiment of the present disclosure.

For example, during the execution time of the driving assistance device, as illustrated in FIGS. 10 to 13, the display elements M10, M40 are displayed so as to be visually recognized as being inclined. On the other hand, during the standby time, as illustrated in FIG. 16, the display elements M10, M40 are displayed so as to be visually recognized as not being inclined with an inclination angle θ of zero. In other words, the lower visible outlines M40C, M10C are made horizontal. Further, when the driving assistance device is in the inactive state, the display elements M10, M40 are deleted so as not to be displayed.

As described above, according to the present embodiment, the shape of each of the display elements M10, M40 is varied between the standby time and the execution time of the driving assistance device. This makes it easy to intuitively recognize whether the driving assistance device is in either the standby state or the execution state.

A steeper inclination angle θ or a higher up-down direction height of the display elements M10, M40 gives a user a stronger impression that the vehicle 10 is automatically controlled so as not to depart from the lane markings R1 to R6. In the present embodiment focusing on this point, the shape of each of the display elements M10, M40 is varied in such a manner that a virtual three-dimensional object with a steeper inclination angle θ or a higher up-down direction height of the display elements M10, M40 is visually recognized at the execution time than at the standby time. Specifically, during the standby time, the inclination angle θ is made zero to make the up-down direction height zero. Thus, it is possible to improve intuitive recognizability to recognize whether the current state is the standby state or the execution state.

Twelfth Embodiment

As described above, the ECU 60 illustrated in FIG. 3 functions as the lane keeping assist device. That is, it is determined whether the vehicle 10 has departed from a part of the traveling road R between the lane markings R1 to R6 against the intension of a driver or whether the possibility of departure is high. Then, when an affirmative determination is made, the ECU 60 controls the operation of the steering device so as to apply a steering force in the direction of preventing the departure.

Figure 17:
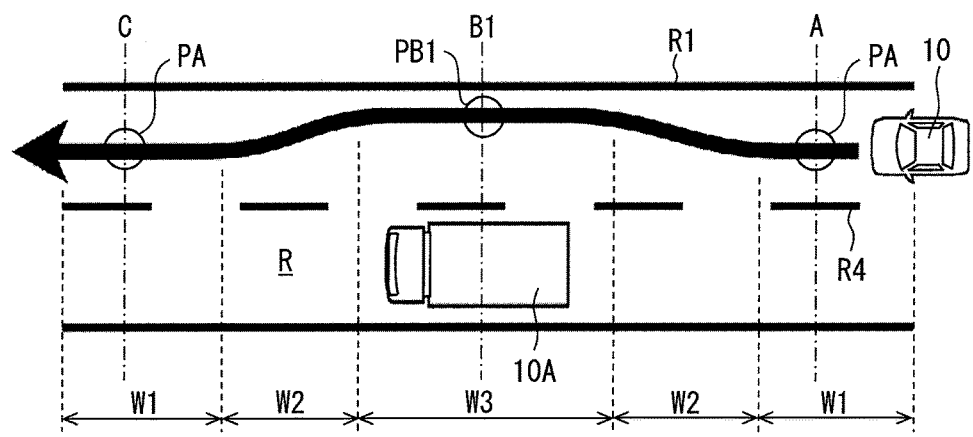
FIG. 17 is a diagram describing an automatic offset function by the driving assistance system in a twelfth embodiment of the present disclosure.
Figure 18:
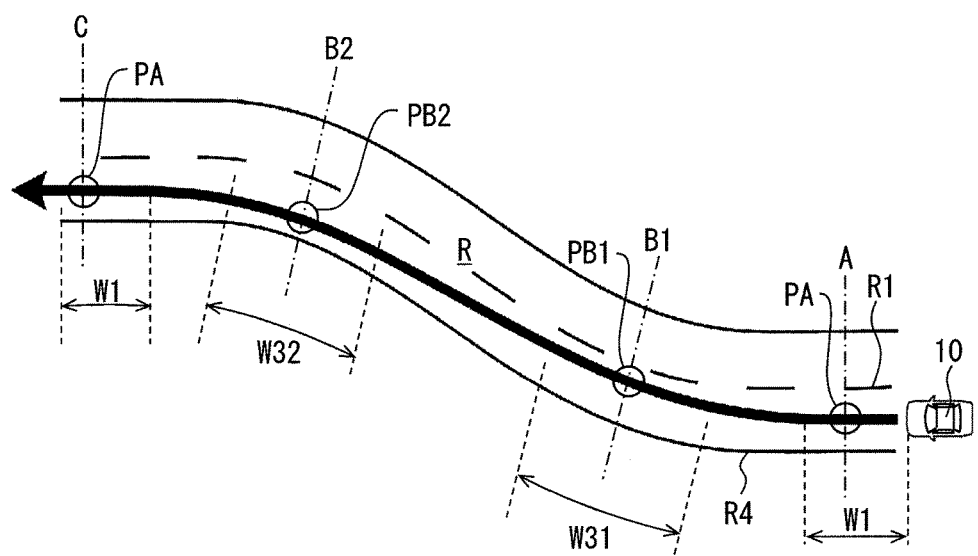
FIG. 18 is a diagram describing an automatic cornering function by the driving assistance system in the twelfth embodiment.

Further, in the present embodiment, the ECU 60 has an automatic offset function illustrated in FIG. 17 and an automatic cornering function illustrated in FIG. 18. The automatic offset function automatically controls a traveling position in the vehicle width direction of the vehicle 10 so as to be temporarily changed from the current position within a range where the vehicle 10 does not depart from a part of the traveling road R between the pair of lane markings R1, R4. A control target includes the steering device, a brake device, and a travel drive output device. Concrete examples of the travel drive output device include an internal combustion engine and an electric motor.

The automatic offset function automatically and temporarily changes the traveling position, in a traveling section where an external object present outside the vehicle 10 and the vehicle 10 travel side by side, in the direction of expanding a distance in the vehicle width direction between the external object and the vehicle 10. In the example of FIG. 17, the external object is a vehicle 10A which travels in the same direction as the vehicle 10 on a lane adjacent to a lane where the vehicle 10 travels. In addition to the vehicle 10A, concrete examples of the external object include a pedestrian and a signboard for traffic control which accompanies road works.

When the vehicle 10 travels along a curve, the automatic cornering function automatically and temporarily changes the traveling position in the direction of reducing a curve traveling radius within the range where the vehicle 10 does not depart from the part between the pair of lane markings R1, R4. In the example of FIG. 18, the traveling position in the vehicle width direction of the vehicle 10 is changed rightward during a period when the vehicle 10 travels rightward along a curve and changed leftward during a period when the vehicle 10 travels leftward along a curve. Accordingly, the curve traveling radius during curve traveling is reduced to reduce a centrifugal force acting on the vehicle 10 by the curve traveling.

In the following description, a current position in the vehicle width direction inside each pair of the lane markings R1 to R6 before operating the automatic offset function or the automatic cornering function is referred to as a reference position PA. In the traveling section of the vehicle 10, a section where the vehicle 10 is going to travel at the reference position PA is referred to as a reference traveling section W1. A section where the vehicle 10 is going to travel at a position that is temporarily changed from the reference position PA, that is, an offset position PB1 is referred to as a changed traveling section W3. A traveling section where the vehicle 10 moves from the reference position PA to the offset position PB1 is referred to as a transient traveling section W2. A section where the vehicle 10 is going to return to the reference position PA by finishing the operation of the automatic offset function or the automatic cornering function is also referred to as the reference traveling section W1.

The display element M10 includes reference display parts M10A, M10C and a change display part M10B1 described below. The display element M40 includes reference display parts M40A, M40C and a changed display part M40B1. The reference display parts M10A, M40A, M10C, M40C are visually recognized at positions associated with the reference traveling section W1. The changed display parts M10B1, M40B1, M10B2, M40B2 are visually recognized at positions associated with the changed traveling section W3, W31, W32.

In the condition of FIG. 17 in which the automatic offset function operates, in the lane markings R1, R4 which are respectively located on the right and left sides of the vehicle 10, the lane marking R4 which is located at the side where the external object is present with respect to the vehicle 10 is referred to as an object side lane marking R4, and the lane marking R1 which is located at the opposite side thereof is referred to as a counter object side lane marking R1. In the reference display parts M10A, M40A, M10C, M40C, the reference display parts M40A, M40C which are visually recognized at positions associated with the object side lane marking R4 are referred to as object side reference display parts M40A, M40C. The reference display parts M10A, M10C which are visually recognized at positions associated with the counter object side lane marking R1 are referred to as counter objet side reference display parts M10A, M10C. In the changed display parts M10B1, M40B1, the changed display part M40B1 which is visually recognized at a position associated with the object side lane marking R4 is referred to as an object side changed display part M40B1, and the changed display part M10B1 which is visually recognized at a position associated with the counter object side lane marking R1 is referred to as a counter object side changed display part 40C.

The generation device 42 generates an image in such a manner that each of the reference display parts M10A, M40A, M10C, M40C and each of the changed display parts M10B1, M40B1 are visually recognized as virtual three-dimensional objects having different shapes. Specifically, the image is generated in such a manner that, in the reference display parts M10A, M40A, M10C, M40C, an inclination angle θ of the objet side reference display parts M40A, M40C and an inclination angle θ of the counter objet side reference display parts M10A, M10C are visually recognized as being equal to each other. Further, the image is generated in such a manner that, in the changed display parts M10B1, M40B1, an inclination angle θ of the object side changed display part M40B1 and an inclination angle θ of the counter object side changed display part M10B1 are visually recognized as being different from each other.

In the condition of FIG. 18 in which the automatic cornering function operates, in the lane markings R1, R4 which are respectively located on the right and left sides of the vehicle 10, a lane marking that is located at the side where the curve traveling radius is large with respect to the vehicle 10 is referred to as an outer lane marking, and a lane marking that is located at the opposite side thereof is referred to as an inner lane marking. In the reference display parts M10A, M40A, M10C, M40C, the reference display parts M40A, M40C which are visually recognized at positions associated with the outer lane marking are referred to as outer reference display parts M40A, M40C. The reference display parts M10A, M10C which are visually recognized at positions associated with the inner lane marking are referred to as inner reference display parts M10A, M10C. In the changed display parts M10B1, M40B1, M10B2, M40B2, the changed display parts M40B1, M10B2 which are visually recognized at positions associated with the outer lane marking are referred to as outer changed display parts M40B1, M10B2. The changed display parts M10B1, M40B2 which are visually recognized at positions associated with the inner lane marking are referred to as inner changed display parts M10B1, M40B2.

The generation device 42 generates the image in such a manner that each of the reference display parts M10A, M40A, M10C, M40C and each of the changed display parts M10B1, M40B1, M10B2, M40B2 are visually recognized as virtual three-dimensional objects having different shapes. Specifically, the image is generated in such a manner that, in the reference display parts M10A, M40A, M10C, M40C, an inclination angle θ of the outer reference display parts M40A, M40C and an inclination angle θ of the inner reference display parts M10A, M10C are visually recognized as being equal to each other. Further, the image is generated in such a manner that, in the changed display parts M10B1, M40B1, an inclination angle θ of the outer changed display parts M40B1, M10B2 and an inclination angle θ of the inner changed display part M10B1, M40B2 are visually recognized as being different from each other.

First, a concrete example of display according to the automatic offset function will be described.

Figure 19:
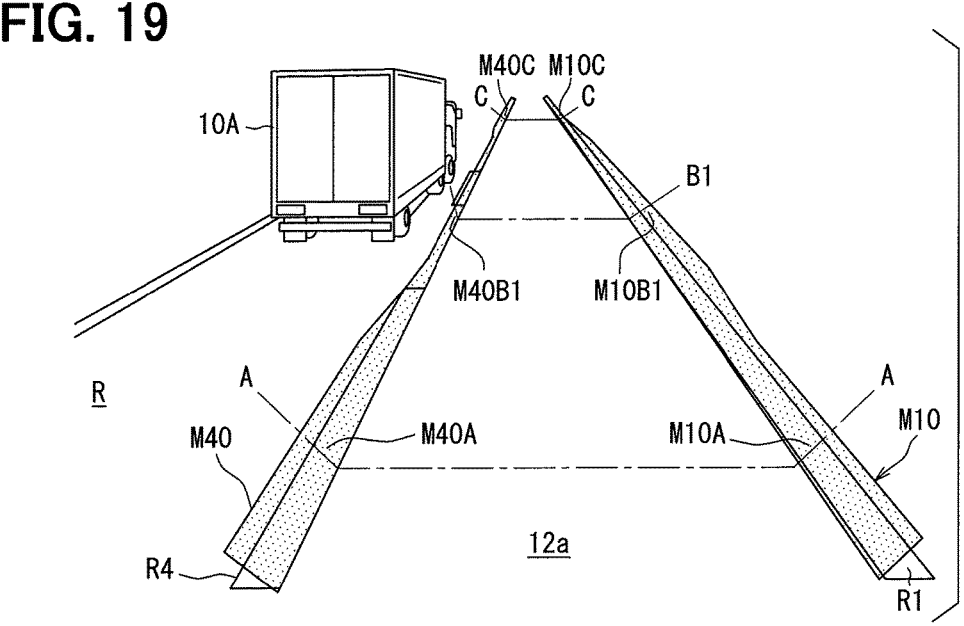
FIG. 19 is a diagram illustrating the shapes of display elements in the traveling condition of FIG. 17.

For example, when the automatic offset function is operated as illustrated in FIG. 17, the shapes of the display elements M10, M40 are set as illustrated in FIG. 19. In the condition illustrated in FIG. 17, the traveling position in the vehicle width direction of the vehicle 10 is changed from the reference position PA to the offset position PB1 during a period when the vehicle 10 passes the vehicle 10A. After the vehicle 10 passes the vehicle 10A, the traveling position is then changed from the offset position PB1 to the current position PA.

Figure 20:
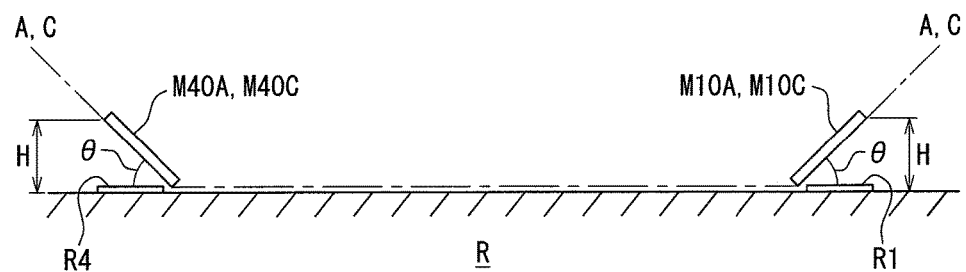
FIG. 20 is an imaginary diagram of the cross-sectional shapes of the display elements taken along dot-dash lines A, C in FIG. 19.

Further, the reference display parts M10A, M40A, M10C, M40C are visually recognized as if the inclination angle θ of the object side reference display parts M40A, M40C and the inclination angle θ of the counter object side reference display parts M10A, M10C were equal to each other. As a result, as illustrated in FIG. 20, the object side reference display part M40A, M40C and the counter object side reference display part M10A, M10C are visually recognized as if the object side reference display part M40A, M40C and the counter object side reference display part M10A, M10C were three-dimensional objects that are inclined with the same inclination angle θ by an optical illusion.

Figure 21:
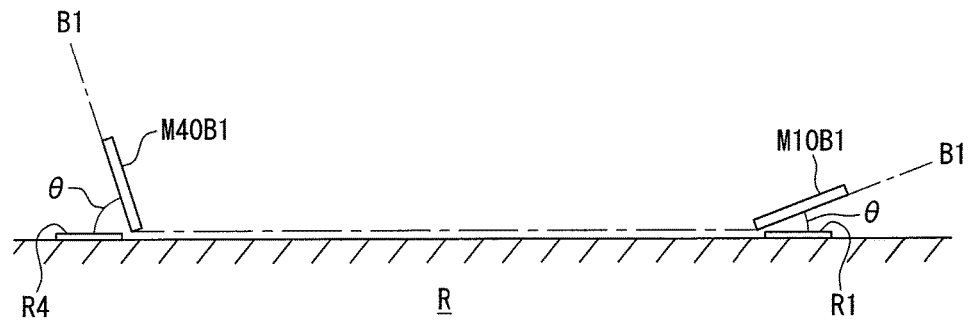
FIG. 21 is an imaginary diagram of the cross-sectional shapes of the display elements taken along a dot-dash line B1 in FIG. 19.

On the other hand, the changed display parts M10B1, M40B1 are visually recognized as if the inclination angle θ of the object side changed display part M40B1 were larger than the inclination angle θ of the counter object side changed display part M10B1. As a result, as illustrated in FIG. 21, the object side changed display part M40B1 and the counter object side changed display part M10B1 are visually recognized as if the object side changed display part M40B1 and the counter object side changed display part M10B1 were three-dimensional objects that are inclined with different inclination angles θ by an optical illusion. Specifically, the object side changed display part M40B1 is visually recognized as if object side changed display part M40B1 were a three-dimensional object that exists with a steeper inclination angle than the counter object side changed display part M10B1 by an optical illusion.

In the example of FIG. 17, the reference position PA is a central part between the object side lane marking R4 and the counter object side lane marking R1. The offset position PB1 is a position that is more distant from the object side lane marking than the reference position PA is.

Next, a concrete example of display according to the automatic cornering function will be described.

Figure 22:
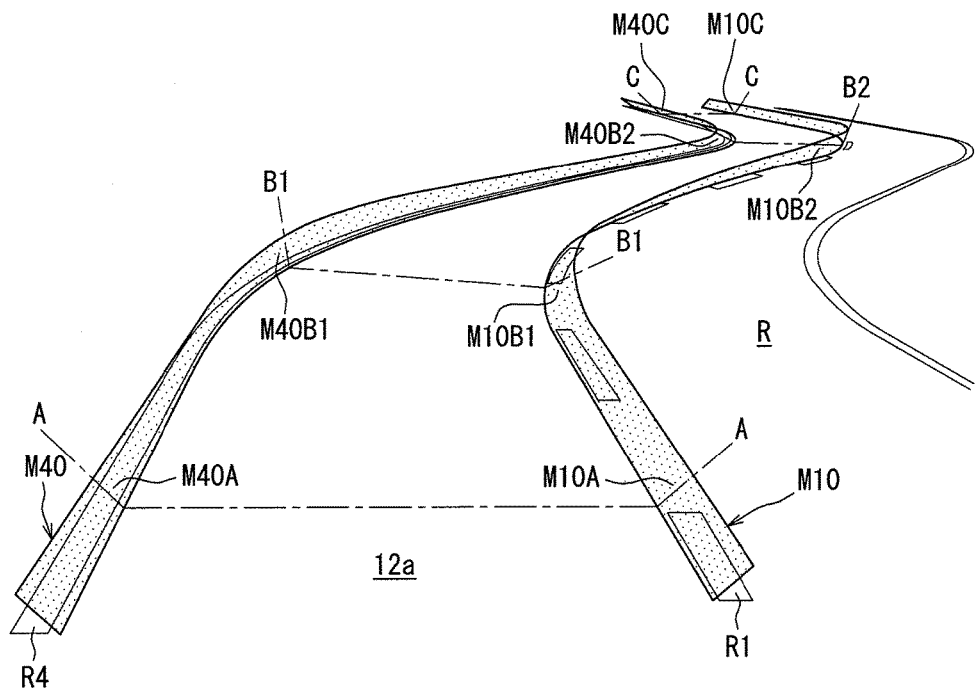
FIG. 22 is a diagram illustrating the shapes of display elements in the traveling condition of FIG. 18.

For example, when the automatic cornering function is operated as illustrated in FIG. 18, the shapes of the display elements M10, M40 are set as illustrated in FIG. 22. In the condition illustrated in FIG. 18, the traveling position in the vehicle width direction of the vehicle 10 is changed from the reference position PA to a right position (the offset position PB1) when the vehicle 10 travels rightward along a curve and changed from the reference position PA to a left position (an offset position PB2) when the vehicle 10 travels leftward along a curve.

Further, the reference display parts M10A, M40A, M10C, M40C are visually recognized as if the inclination angle θ of the outer reference display parts M40A, M40C and the inclination angle θ of the inner reference display parts M10A, M10C were equal to each other, and, as a result, visually recognized as illustrated in FIG. 20 by an optical illusion.

On the other hand, the changed display parts M10B1, M40B1 associated with the changed traveling section W31 where the vehicle 10 travels along the right curve are visually recognized as if the inclination angle θ of the outer changed display part M40B1 were larger than the inclination angle θ of the inner changed display part M10B1, and, as a result, visually recognized as illustrated in FIG. 21 by an optical illusion. Specifically, the outer changed display part M40B1 is visually recognized as if the outer changed display part M40B1 were a three-dimensional object that exists with a steeper inclination angle than the inner changed display part M10B1 by an optical illusion.

Figure 23:
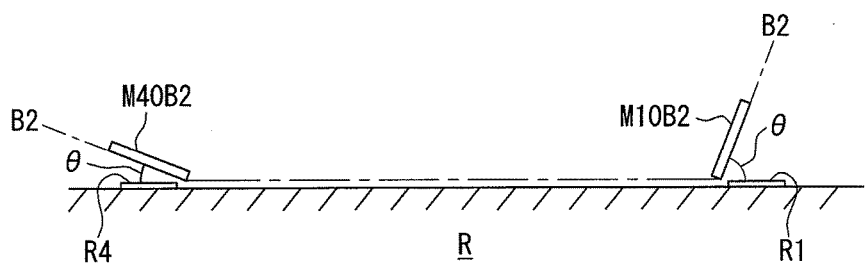
FIG. 23 is an imaginary diagram of the cross-sectional shapes of the display elements taken along a dot-dash line B2 in FIG. 22.

Further, the changed display parts M10B2, M40B2 associated with the changed traveling section W32 where the vehicle 10 travels along the left curve are visually recognized as if the inclination angle θ of the outer changed display part M10B2 were larger than the inclination angle θ of the inner changed display part M4062, and, as a result, visually recognized as illustrated in FIG. 23 by an optical illusion. Specifically, the outer changed display part M10B2 is visually recognized as if the outer changed display part M10B2 were a three-dimensional object that exists with a steeper inclination angle than the inner changed display part M40B2 by an optical illusion.

As described above, according to the present embodiment, the generation device 42 generates the display image in such a manner that each of the reference display parts M10A, M10C, M40A, M40C and each of the changed display parts M10B1, M40B1 are visually recognized as virtual three-dimensional objects having different shapes.

According to this configuration, when the automatic offset function or the automatic cornering function is operated to automatically change the traveling position from the current position (reference position PA) to the offset position PB1, PB2, the reference display part and the changed display part can be visually recognized as different shapes prior to the change. Further, the reference display part is visually recognized at a position associated with the reference traveling section W1, and the changed display part is visually recognized at a position associated with the changed traveling section W3, W31, W32. This makes it easy for a user who makes such a visual recognition to intuitively grasp that automatic control is performed so as to change the traveling position in the changed traveling section W3, W31, W32. Thus, prior to automatically offset-moving the traveling position by the automatic offset function or the automatic cornering function, it is possible to allow a user to intuitively grasp that the automatic control is going to be performed.

Further, in the present embodiment, when the traveling position is automatically offset-moved by the automatic offset function, the generation device 42 generates the display image in such a manner that the object side changed display part M40B1 and the object side reference display part M40A are visually recognized as virtual three-dimensional objects having different shapes.

According to this configuration, one of the pair of right and left display parts, the one being located at the side where the external object is present, is changed. That is, the object side reference display part M40A associated with the reference traveling section W1 and the object side changed display part M40B1 associated with the changed traveling section W3 can be visually recognized as different shapes. This makes it easy for a user who makes such a visual recognition to intuitively grasp whether the external object is present on either the right or left side, that is, whether the offset movement is performed to either the right or left side. Thus, prior to automatically offset-moving the traveling position by the automatic offset function, it is possible to allow a user to intuitively grasp that the offset movement is going to be performed.

A steeper inclination angle θ of the display elements M10, M40 gives a user a stronger impression that the vehicle 10 is automatically controlled so as not to depart from the lane markings R1, R4. In the present embodiment focusing on this point, the generation device 42 generates the display image in such a manner that the object side changed display part M40B1 is visually recognized as a virtual three-dimensional object with a steeper inclination angle than the object side reference display part M40A. Thus, prior to automatically offset-moving the traveling position by the automatic offset function, it is possible to allow a user to intuitively grasp a direction of the offset movement, that is, a direction separating from the external object.

Further, in the present embodiment, the generation device 42 generates the display image in such a manner that the counter object side changed display part M10B1 and the counter object side reference display part M10A are visually recognized as virtual three-dimensional objects having different shapes. That is, making the shapes of display parts different from each other between the reference traveling section W1 and the changed traveling section W3, W31, W32 is also applied to the counter object side display parts in addition to the object side display parts. Thus, it is possible to facilitate the above effect of allowing a user to intuitively grasp that the traveling position is going to be automatically offset-moved.

Further, in the present embodiment, the generation device 42 generates the display image in such a manner that the counter object side changed display part M10B1 is visually recognized as a virtual three-dimensional object with a gentler inclination angle than the inclination angle of the counter object side reference display part M10A. Thus, at the counter object side, an impression given to a user that the vehicle 10 is automatically controlled so as not to depart from the lane markings R1, R4 at a changed position becomes weak. Thus, prior to automatically offset-moving the traveling position by the automatic offset function, it is possible to facilitate allowing a user to intuitively grasp a direction of the offset movement, that is, a direction separating from the external object.

Further, in the present embodiment, when the traveling position is automatically moved by the automatic cornering function, the generation device 42 generates the display image in such a manner that the outer changed display part M40B1 and the outer reference display part M40A are visually recognized as virtual three-dimensional objects having different shapes.

Accordingly, one of the pair of right and left display parts, the one being located at the side having a larger curve traveling radius, is changed. That is, the outer reference display part M40A associated with the reference traveling section W1 and the outer changed display part M40B1 associated with the changed traveling section W31 can be visually recognized as different shapes. This makes it easy for a user who makes such a visual recognition to intuitively grasp whether the traveling position is moved to either the right or left side. Thus, prior to automatically moving the traveling position by the automatic cornering function, it is possible to allow a user to intuitively grasp the movement.

A steeper inclination angle θ of the display elements M10, M40 gives a user a stronger impression that the vehicle 10 is automatically controlled so as not to depart from the lane markings R1, R4. In the present embodiment focusing on this point, the generation device 42 generates the display image in such a manner that the outer changed display part M40B1 is visually recognized as a virtual three-dimensional object with a steeper inclination angle than the outer reference display part M40A. Thus, prior to automatically moving the traveling position by the automatic cornering function, it is possible to allow a user to intuitively grasp a direction of the movement.

Further, in the present embodiment, the generation device 42 generates the display image in such a manner that the inner changed display part M10B1 and the inner reference display part M10A are visually recognized as virtual three-dimensional objects having different shapes. That is, making the shapes of display parts different from each other between the reference traveling section W1 and the changed traveling section W3, W31, W32 is also applied to the inner display parts in addition to the outer display parts. Thus, it is possible to facilitate the above effect of allowing a user to intuitively grasp that the traveling position is going to be automatically moved.

Further, in the present embodiment, the generation device 42 generates the display image in such a manner that the inner changed display part M10B1 is visually recognized as a virtual three-dimensional object with a gentler inclination angle than the inclination angle of the inner reference display part M10A. Thus, at the inner side, an impression given to a user that the vehicle 10 is automatically controlled so as not to depart from the lane markings R1, R4 at a changed position becomes weak. Thus, prior to automatically moving the traveling position by the automatic cornering function, it is possible to facilitate allowing a user to intuitively grasp a direction of the movement.

Thirteenth Embodiment

In the twelfth embodiment, the display part associated with the reference traveling section W1 and the display part associated with the changed traveling section W3 are visually recognized as having different inclination angles θ. On the other hand, in the present embodiment, the display part associated with the reference traveling section W1 and the display part associated with the changed traveling section W3 are visually recognized as having different up-down direction heights.

Figure 24:
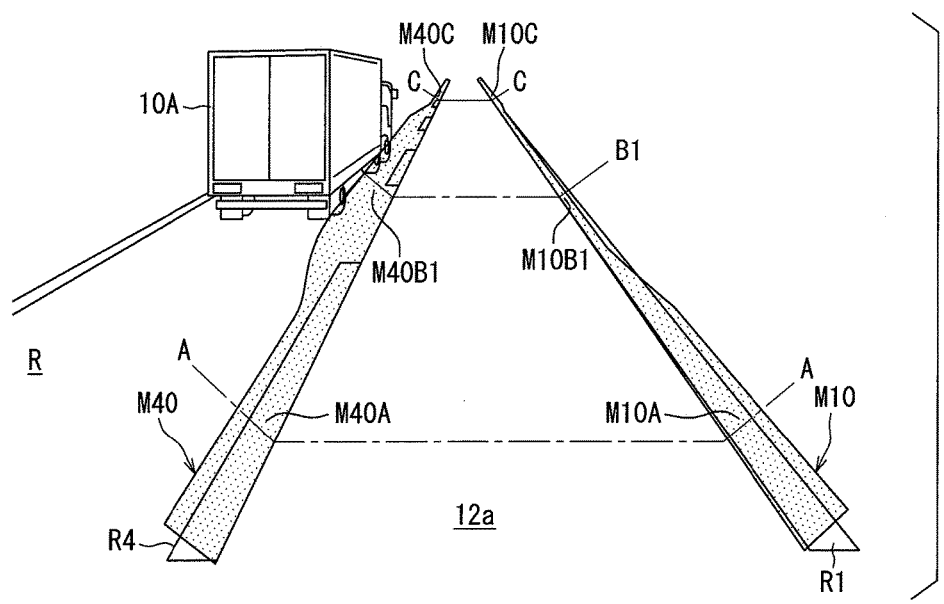
FIG. 24 is a diagram illustrating the shapes of display elements in the traveling condition of FIG. 17 in a thirteenth embodiment of the present disclosure.

Specifically, when the automatic offset function is operated as illustrated in FIG. 17, the shapes of the display elements M10, M40 are set as illustrated in FIG. 24.

The reference display parts M10A, M40A, M10C, M40C are visually recognized as if the up-down direction height of the object side reference display parts M40A, M40C were equal to the up-down direction height of the counter object side reference display parts M10A, M10C. As a result, as illustrated in FIG. 20, in the objet side reference display parts M40A, M40C and the counter object side reference display parts M10A, M10C, the display parts are visually recognized as if the object side display part and the counter object side display part were three-dimensional objects having the same up-down direction height by an optical illusion.

Figure 25:
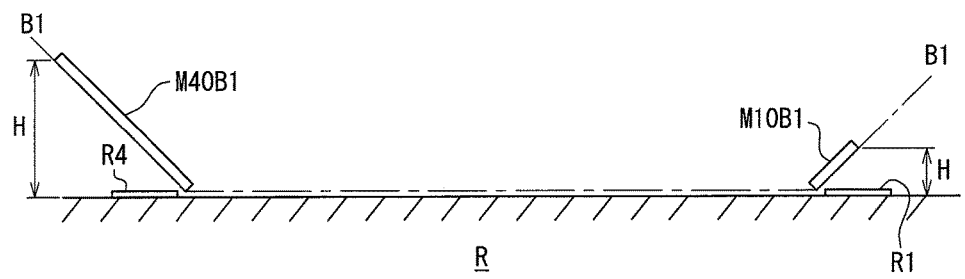
FIG. 25 is an imaginary diagram of the cross-sectional shapes of the display elements taken along a dot-dash line B10 in FIG. 24.

On the other hand, the changed display parts M10B1, M40B1 are visually recognized as if the up-down direction height of the object side changed display part M40B1 were larger than the up-down direction height of the counter object side changed display part M10B1. As a result, as illustrated in FIG. 25, the display parts are visually recognized as if the object side display part were a three-dimensional object having a higher up-down direction height H than the counter object side display part by an optical illusion. Note that the inclination angle θ is set to be equal between the object side and the counter object side at both the reference position and the changed position.

Figure 26:
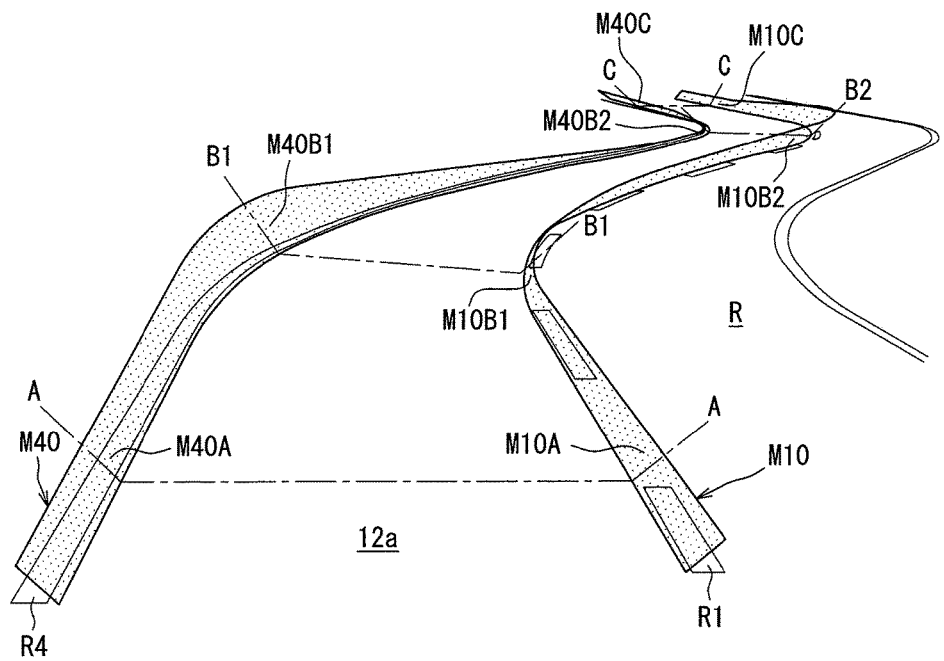
FIG. 26 is a diagram illustrating the shapes of display elements in the traveling condition of FIG. 18.

Next, a concrete example of display according to the automatic cornering function will be described. For example, when the automatic cornering function is operated as illustrated in FIG. 18, the shapes of the display elements M10, M40 are set as illustrated in FIG. 26.

The reference display parts M10A, M40A, M10C, M40C are visually recognized as if the up-down direction height H of the outer reference display parts M40A, M40C were equal to the up-down direction height of the inner reference display parts M10A, M10C, and, as a result, visually recognized as illustrated in FIG. 20 by an optical illusion.

On the other hand, the changed display parts M10B1, M40B1 associated with the changed traveling section W31 where the vehicle 10 travels along the right curve are visually recognized as if the up-down direction height H of the outer changed display part M40B1 at the outer side of curve traveling were larger than the up-down direction height H of the inner changed display part M10B1 at the inner side of curve traveling, and, as a result, visually recognized as illustrated in FIG. 25 by an optical illusion.

Figure 27:
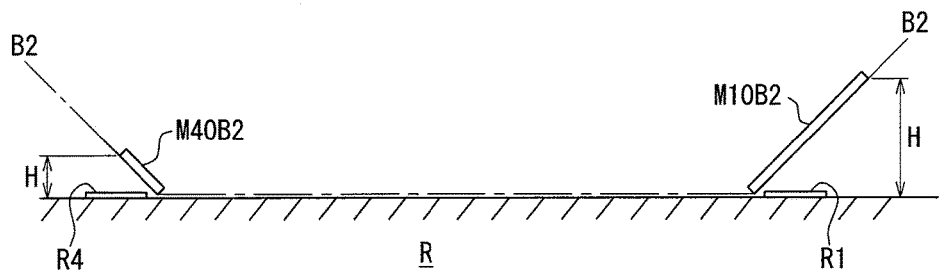
FIG. 27 is an imaginary diagram of the cross-sectional shapes of the display elements taken along a dot-dash line B20 in FIG. 26.

Further, the changed display parts M10B2, M40B2 associated with the changed traveling section W32 where the vehicle 10 travels along the left curve are visually recognized as if the up-down direction height H of the outer changed display part M10B2 at the outer side of curve traveling were larger than the up-down direction height H of the inner changed display part M40B2 at the inner side of curve traveling, and, as a result, visually recognized as illustrated in FIG. 27 by an optical illusion.

As described above, according to the present embodiment, similarly to the twelfth embodiment, each of the reference display parts M10A, M10C, M40A, M40C and each of the changed display parts M10B1, M40B1 are visually recognized as virtual three-dimensional objects having different shapes. Further, the object side changed display part M40B1 and the object side reference display part M40A are visually recognized as virtual three-dimensional objects having different shapes. Further, the outer changed display part M40B1 and the outer reference display part M40A are visually recognized as virtual three-dimensional objects having different shapes. Thus, prior to automatically moving the traveling position by the automatic offset function or the automatic cornering function, it is possible to allow a user to intuitively grasp that the automatic control is going to be performed.

A higher up-down direction height H of the display elements M10, M40 gives a user a stronger impression that the vehicle 10 is automatically controlled so as not to depart from the lane markings R1, R4. In the present embodiment focusing on this point, the generation device 42 generates the display image in such a manner that the object side changed display part M40B1 is visually recognized as a virtual three-dimensional object with a higher up-down direction height H than the object side reference display part M40A. Thus, prior to automatically offset-moving the traveling position by the automatic offset function, it is possible to allow a user to intuitively grasp a direction of the offset movement, that is, a direction separating from the external object. Further, the generation device 42 generates the display image in such a manner that the outer changed display part M40B1 is visually recognized as a virtual three-dimensional object with a higher up-down direction height H than the outer reference display part M40A. Thus, prior to automatically moving the traveling position by the automatic cornering function, it is possible to allow a user to intuitively grasp a direction of the movement.

Further, in the present embodiment, the generation device 42 generates the display image in such a manner that the counter object side changed display part M10B1 is visually recognized as a virtual three-dimensional object with a lower up-down direction height H than the up-down direction height H of the counter object side reference display part M10A. Thus, at the counter object side, an impression given to a user that the vehicle 10 is automatically controlled so as not to depart from the lane markings R1, R4 at a changed position becomes weak. Thus, prior to automatically offset-moving the traveling position by the automatic offset function, it is possible to facilitate allowing a user to intuitively grasp a direction of the offset movement, that is, a direction separating from the external object. Further, the generation device 42 generates the display image in such a manner that the inner changed display part M10B1 is visually recognized as a virtual three-dimensional object with a lower up-down direction height H than the up-down direction height H of the inner reference display part M10A. Thus, at the inner side of curve traveling, an impression given to a user that the vehicle 10 is automatically controlled so as not to depart from the lane markings R1, R4 at a changed position becomes weak. Thus, prior to automatically moving the traveling position by the automatic cornering function, it is possible to facilitate allowing a user to intuitively grasp a direction of the movement.

Other Embodiments

Although the preferred embodiments of the disclosure have been described above, the disclosure is not limited at all to the above embodiments and can be modified in various manners as exemplified below. Not only combinations of parts that are specifically and clearly stated that the combinations are possible in each of the embodiments, but also partial combinations of the embodiments are also possible even if not clearly stated unless otherwise the combinations constitute a hindrance.

The right and left display elements M1 to M6 may be displayed in different modes when the driving assistance device applies a steering force in the direction of preventing departure from the lane markings R1 to R6 to make it easy to intuitively recognize the contents of the operation of the driving assistance device. For example, when the vehicle 10 has departed from the left side lane markings R4, R5, R6 of FIG. 2 or when the possibility of departure is a predetermined possibility or more, the driving assistance device applies a steering force in the direction of moving the traveling direction of the vehicle 10 rightward. In this case, the left side display elements M4, M5, M6 are caused to flash or a display color thereof is changed so that the left side display elements M4, M5, M6 are more emphasized than the right side display elements M1, M2, M3.

Further, the degree of departure or the degree of the possibility of departure may be represented by the inclination angle of the display elements M1 to M6. That is, the inclination angle may be made steeper as the amount of departure from the lane markings R1 to R6 becomes larger, or the possibility of departure becomes higher.

The driving assistance device (ECU 60) illustrated in FIG. 3 assists driving by applying a steering force. When the vehicle 10 has departed from the lane markings R1 to R6 or when the possibility of departure is a predetermined possibility or more, an alarm sound or an alarm voice may be output from a speaker.

In the first embodiment, the display image is generated in such a manner that, corresponding to the lane markings R1 to R6 arranged at a predetermined pitch in the traveling direction of the traveling road R, the plurality of display elements M1 to M6 are also visually recognized as being arranged at the predetermined pitch in the traveling direction. Alternatively, the display image may be generated in such a manner that the display elements M1 to M6 are visually recognized at a pitch different from the pitch of the traveling road R.

When there is a pedestrian who has a predetermined degree of possibility of collision with the vehicle 10 or more, it is desired to prohibit the display of the display elements M1 to M6 to facilitate concentration of an attention to the pedestrian. Further, when the lane markings R1 to R6 are not detected, it is desired to prohibit the display of the display elements M1 to M6.

The color of the display elements M1 to M6 may be changed according to the color of the lane markings R1 to R6 or the traveling road R detected by the front camera 50. For example, the color of the display elements M1 to M6 may be changed to an inconspicuous color to reduce an uncomfortable feeling with the display elements M1 to M6.

In each of the above embodiments, the inner region surrounded by the visible outlines M4a, M4b, M4c, M4d of each of the display elements M1 to M6 is displayed in a predetermined color, and each of the visible outlines M4a, M4b, M4c, M4d (contours) and the inner region are displayed in different colors. Alternatively, each of the visible outlines M4a, M4b, M4c, M4d and the inner region may be displayed in the same color. In other words, the display of the visible outlines M4a, M4b, M4c, M4d may be deleted so as to display only the inner region. The transmittance of the display color of the inner region may be set to be low enough to make a superimposed part between the traveling road R and the display elements M1 to M6 visually unrecognizable or may be set to be high enough to make the superimposed part visually recognizable.

In the twelfth and thirteenth embodiments, the display image is generated in such a manner that the counter object side reference display part M10A and the counter object side changed display part M10B1 are visually recognized as virtual three-dimensional objects having different shapes. Alternatively, the display image may be generated in such a manner that the counter object side reference display part M10A and the counter object side changed display part M10B1 are visually recognized as virtual three-dimensional objects having the same shape. That is, the counter object side changed display part M10B1 may not be visually recognized as having a gentle inclination angle θ or having a low up-down direction height H. Similarly, the display image may be generated in such a manner that the inner reference display part M10A and the inner changed display part M10B1 are visually recognized as virtual three-dimensional objects having the same shape.

In the twelfth and thirteenth embodiments, the reference display part and the changed display part are visually recognized as having different inclination angles or different up-down direction heights. Alternatively, the reference display part and the changed display part may be visually recognized differently from each other by other modes. Further, the reference display part and the changed display part may be displayed in different colors. Further, the object side changed display part M40B1 and the outer changed display part M40B1 may be displayed in a color different from the color of the other display parts.

In the eighth to tenth embodiments, the display elements are visually recognized as having different inclination angles or different up-down direction heights according to the recognition rate. Alternatively, the shapes of the display elements may be made different from each other according to the recognition rate by other modes. Further, the colors of the display elements may be made different from each other according to the recognition rate.

In the example of FIG. 1, light of the display image emitted from the HUD 30 is projected on the reflecting sheet 12a. Alternatively, the reflecting sheet 12a may be omitted, and light of the display image may be directly projected on the windshield 12. In such a mode, the windshield 12 forms the projection area 12p. Further, a light transmissive projection member which is a separate body from the windshield 12 may be disposed in front of the driver's seat, and light of the display image may be projected on the projection member. In such a mode, the face of the projection member facing the driver forms the projection area 12p. In the example illustrated in FIG. 1, the HUD 30 which emits light of the display image from the liquid crystal panel 31 is employed. Alternatively, an HUD that emits light of the display image by performing scanning with a laser beam instead of the liquid crystal panel 31 may be employed.

Means and/or a function of the ECU 40 (control device) can be provided by a software recorded in a substantial storage medium and a computer that executes the software, a software only, a hardware only, or a combination thereof. For example, when the control device is provided by a circuit as a hardware, the control device can be provided by a digital circuit including many logic circuits or an analog circuit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An image processing device that generates a display image and is applied to a driving assistance system, which includes:
   a driving assistance device that detects a relative position of a lane marking arranged on a traveling road with respect to a vehicle and assists a driving of the vehicle based on a detected positional information; and
   a head-up display device that projects a display image on a projection area arranged on the vehicle to visually recognize a virtual image of the display image,
   the image processing device comprising:
   an acquisition device that acquires the positional information; and
   a generation device that generates the display image including a predetermined display element, wherein:
   the generation device generates the display image to visually recognize the display element at a position associated with the positional information acquired by the acquisition device and to visually recognize the display element as a shape inclined toward the vehicle from the lane marking; and
   the generation device generates the display image to vary a shape of the display element according to a detection accuracy of the relative position detected by the driving assistance device.

2. The image processing device according to claim 1, wherein:
   the generation device generates the display image to visually recognize the display element approaching a driver of the vehicle with an approach of the lane marking to the vehicle while the vehicle travels.

3. The image processing device according to claim 1, wherein:
   the generation device generates the display image to visually recognize the display element to keep a distance between a driver of the vehicle and the display element constant even when the lane marking approaches the vehicle while the vehicle travels.

4. The image processing device according to claim 1, wherein:
   the generation device generates the display image to visually recognize the display element as a first virtual plane and the lane marking as a second virtual plane and to visually recognize a virtual three-dimensional object including the first virtual plane and the second virtual plane.

5. The image processing device according to claim 1, wherein:
   the generation device generates the display image to visually recognize the display element to be superimposed on the lane marking.

6. The image processing device according to claim 1, wherein:
   when a plurality of lane markings are arranged at a predetermined pitch in a traveling direction of the traveling road, the generation device generates the display image to visually recognize a plurality of display elements to be arranged at the predetermined pitch in the traveling direction.

7. The image processing device according to claim 1, wherein:
   when the driving assistance device detects each of lane markings located on a right side and a left side of the vehicle,
   the generation device generates the display image to visually recognize the display element with respect to each of the lane markings.

8. The image processing device according to claim 1, wherein:
   the generation device generates the display image to visually recognize the display element as a shape inclined in a direction of reducing an up-down direction height toward the vehicle from the lane marking.

9. The image processing device according to claim 1, wherein:
   the generation device generates the display image to visually recognize the display element to have a steeper inclination angle or a higher up-down direction height as the detection accuracy becomes higher.

10. An image processing device that generates a display image and is applied to a driving assistance system, which includes:
    a driving assistance device that detects a relative position of a lane marking arranged on a traveling road with respect to a vehicle and assists a driving of the vehicle based on a detected positional information; and
    a head-up display device that projects a display image on a projection area arranged on the vehicle to visually recognize a virtual image of the display image,
    the image processing device comprising:
    an acquisition device that acquires the positional information; and
    a generation device that generates the display image including a predetermined display element, wherein:
    the generation device generates the display image to visually recognize the display element at a position associated with the positional information acquired by the acquisition device and to visually recognize the display element as a shape inclined toward the vehicle from the lane marking; and
    the generation device generates the display image to vary a shape of the display element between a standby time when the driving assistance device stands by without starting a driving assistance although the driving assistance device detects the lane marking and an execution time when the driving assistance device executes the driving assistance.

11. The image processing device according to claim 10, wherein:
the generation device generates the display image to visually recognize the display element to have a steeper inclination angle or a higher up-down direction height at the execution time than at the standby time.

12. The image processing device according to claim 10, wherein:
the driving assistance device has a function of automatically controlling a traveling position in a vehicle width direction of the vehicle to be temporarily changed from a current position within a range where the vehicle does not depart from a part of the traveling road between a pair of lane markings;
a travelling section of the vehicle where the vehicle travels at the current position is defined as a reference traveling section, and another travelling section of the vehicle where the vehicle travels at a position temporarily changed from the current position is defined as a changed traveling section;
the display element includes a reference display part that is visually recognized at a position associated with the reference traveling section and a changed display part that is visually recognized at a position associated with the changed traveling section; and
the generation device generates the display image to visually recognize the changed display part and the reference display part as virtual three-dimensional objects having different shapes.

13. The image processing device according to claim 12, wherein:
the automatic control function temporarily changes the traveling position, toward a direction of expanding a distance between the external object and the vehicle in the vehicle width direction, in a traveling section where an external object existing an outside of the vehicle and the vehicle travel side by side in the vehicle width direction;
one of lane markings located on a right side and a left side of the vehicle, the one being located at a side where the external object exists with respect to the vehicle, is defined as an object side lane marking;
a part of the changed display part that is visually recognized at a position associated with the object side lane marking is defined as an object side changed display part;
a part of the reference display part that is visually recognized at a position associated with the object side lane marking is defined as an object side reference display part; and
the generation device generates the display image to visually recognize at least the object side changed display part and the object side reference display part as virtual three-dimensional objects having different shapes.

14. The image processing device according to claim 13, wherein:
the generation device generates the display image to visually recognize the objet side changed display part as a virtual three-dimensional object having a steeper inclination angle or a higher up-down direction height than the object side reference display part.

15. The image processing device according to claim 13, wherein:

one of the lane markings located on the right side and the left side of the vehicle, the one being located opposite to the side where the external object exists with respect to the vehicle, is defined as a counter object side lane marking;
a part of the changed display part that is visually recognized at a position associated with the counter object side lane marking is defined as a counter object side changed display part;
a part of the reference display part that is visually recognized at a position associated with the counter object side lane marking is defined as a counter object side reference display part; and
the generation device generates the display image visually recognize the counter object side changed display part and the counter object side reference display part as virtual three-dimensional objects having different shapes.

16. The image processing device according to claim 15, wherein:
the generation device generates the display image to visually recognize the counter objet side changed display part as a virtual three-dimensional object having a gentler inclination angle or a lower up-down direction height than the counter object side reference display part.

17. The image processing device according to claim 12, wherein:
the automatic control function temporarily changes the traveling position toward a direction of reducing a curve traveling radius, in a traveling section where the vehicle travels along a curve;
one of lane markings located on a right side and a left side of the vehicle, the one being located at a side where the curve traveling radius is larger with respect to the vehicle, is defined as an outer lane marking;
a part of the changed display part that is visually recognized at a position associated with the outer lane marking is defined as an outer changed display part;
a part of the reference display part that is visually recognized at a position associated with the outer lane marking is defined as an outer reference display part; and
the generation device generates the display image to visually recognize at least the outer changed display part and the outer reference display part as virtual three-dimensional objects having different shapes.

18. The image processing device according to claim 17, wherein:
the generation device generates the display image to visually recognize the outer changed display part as a virtual three-dimensional object having a steeper inclination angle or a higher up-down direction height than the outer reference display part.

19. The image processing device according to claim 17, wherein:
one of the lane markings located on the right side and the left side of the vehicle, the one being located at a side where the curve traveling radius is smaller with respect to the vehicle, is defined as an inner lane marking;
a part of the changed display part that is visually recognized at a position associated with the inner lane marking is defined as an inner changed display part;
a part of the reference display part that is visually recognized at a position associated with the inner lane marking is defined as an inner reference display part; and the generation device generates the display image to visually recognize the inner changed display part and the inner reference display part as virtual three-dimensional objects having different shapes.

20. The image processing device according to claim 19, wherein:
the generation device generates the display image to visually recognize the inner changed display part as a virtual three-dimensional object having a gentler inclination angle or a lower up-down direction height than the inner reference display part.

* * * * *

UNITED STATES PATENT AND TRADEMARK OFFICE
CERTIFICATE OF CORRECTION

PATENT NO. : 10,166,998 B2
APPLICATION NO. : 15/527931
DATED : January 1, 2019
INVENTOR(S) : Akira Kamiya Page 1 of 1

It is certified that error appears in the above-identified patent and that said Letters Patent is hereby corrected as shown below:

In the Specification

In Column 8, Line 3, delete "121" and insert --R1--.

In Column 16, Line 62, delete "objet" and insert --object--.

In Column 17, Line 11, delete "objet" and insert --object--.

In Column 17, Line 12, delete "objet" and insert --object--.

In Column 18, Line 61, delete "9" and insert --Θ--.

In Column 19, Line 6, delete "M4062," and insert --M40B2,--.

In Column 21, Line 40, delete "objet" and insert --object--.

In the Claims

In Column 27, Line 62, Claim 14, delete "objet" and insert --object--.

In Column 28, Line 22, Claim 16, delete "objet" and insert --object--.

Signed and Sealed this
Fourteenth Day of April, 2020

Andrei Iancu
*Director of the United States Patent and Trademark Office*